US009729685B2

United States Patent
Ive et al.

(10) Patent No.: US 9,729,685 B2
(45) Date of Patent: Aug. 8, 2017

(54) COVER FOR A TABLET DEVICE

(75) Inventors: Jonathan P. Ive, San Francisco, CA (US); Duncan R. Kerr, San Francisco, CA (US); Matthew D. Rohrbach, San Francisco, CA (US); Steve P. Hotelling, San Jose, CA (US); Christopher T. Mullens, San Francisco, CA (US); Martin P. Grunthaner, Mountain View, CA (US); Michael A. Cretella, Jr., San Francisco, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 13/247,942

(22) Filed: Sep. 28, 2011

(65) Prior Publication Data

US 2013/0076614 A1 Mar. 28, 2013

(51) Int. Cl.
*G09G 5/00* (2006.01)
*G06F 3/00* (2006.01)
*H04M 1/02* (2006.01)
*G06F 1/16* (2006.01)
*H04M 1/725* (2006.01)
*A45C 11/00* (2006.01)

(52) U.S. Cl.
CPC ........... *H04M 1/0245* (2013.01); *A45C 11/00* (2013.01); *G06F 1/1626* (2013.01); *G06F 1/1677* (2013.01); *H04M 1/0283* (2013.01); *H04M 1/72527* (2013.01); *H04M 1/72575* (2013.01); *A45C 2011/003* (2013.01); *G06F 2200/1634* (2013.01); *H04M 2250/12* (2013.01)

(58) Field of Classification Search
CPC ......... G09G 5/00; G06F 1/1677; G06F 3/039; G06F 1/1626; G06F 2200/1634; A45C 11/00; A45C 2011/003; H04M 2250/12; H04M 1/0245; H04M 1/0283; H04M 1/72527; H04M 1/72575
USPC .............................. 345/156; 455/90.3, 575.1
See application file for complete search history.

(56) References Cited

U.S. PATENT DOCUMENTS

| | | |
|---|---|---|
| 6,535,199 B1 | 3/2003 | Canova, Jr. et al. |
| 6,870,732 B2 | 3/2005 | Huang et al. |
| 7,025,274 B2 | 4/2006 | Solomon et al. |
| 7,069,056 B2 | 6/2006 | Iwata et al. |
| 7,205,475 B2 | 4/2007 | Jiang et al. |
| 7,288,934 B1 | 10/2007 | Ikarashi et al. |
| 7,492,583 B2 * | 2/2009 | Lv ............................. 361/679.26 |
| 7,541,907 B2 | 6/2009 | Wang et al. |
| 7,639,479 B2 | 12/2009 | Chuang et al. |
| 7,688,315 B1 | 3/2010 | Gettemy et al. |

(Continued)

FOREIGN PATENT DOCUMENTS

| | | |
|---|---|---|
| AU | 2011100423 A4 | 6/2011 |
| CN | 101957640 | 1/2011 |

(Continued)

OTHER PUBLICATIONS

"Cloak 2,"Quirky Incorporated, 2011.

(Continued)

*Primary Examiner* — Jimmy H Nguyen
*Assistant Examiner* — Yaron Cohen
(74) *Attorney, Agent, or Firm* — Downey Brand LLP

(57) ABSTRACT

Accurate and reliable techniques for determining information of an accessory device in relation to an electronic device are described.

18 Claims, 17 Drawing Sheets

(56) References Cited

U.S. PATENT DOCUMENTS

| | | | |
|---|---|---|---|
| 7,692,667 B2 | 4/2010 | Nguyen et al. | |
| 7,907,394 B2 | 3/2011 | Richardson et al. | |
| 7,986,420 B2 | 7/2011 | Harris | |
| 8,009,158 B2 | 8/2011 | Chen et al. | |
| 8,030,914 B2 | 10/2011 | Alameh et al. | |
| 8,143,982 B1 | 3/2012 | Lauder et al. | |
| 8,242,868 B2 | 8/2012 | Lauder et al. | |
| 8,253,518 B2 | 8/2012 | Lauder et al. | |
| 8,264,310 B2 | 9/2012 | Lauder et al. | |
| 8,289,115 B2 | 10/2012 | Cretella, Jr. et al. | |
| 8,390,411 B2 | 3/2013 | Lauder et al. | |
| 8,570,736 B2 | 10/2013 | McClure et al. | |
| 8,587,939 B2 | 11/2013 | McClure et al. | |
| 8,624,695 B2 | 1/2014 | Cretella, Jr. et al. | |
| 8,724,300 B2 | 5/2014 | Smith et al. | |
| 8,847,979 B2 | 9/2014 | Smith et al. | |
| 8,863,038 B2 | 10/2014 | King et al. | |
| 8,947,874 B2 | 2/2015 | Andre et al. | |
| 9,035,872 B2 | 5/2015 | Brown et al. | |
| 9,125,272 B2 | 9/2015 | Huang | |
| 2003/0008679 A1* | 1/2003 | Iwata | H04M 1/0214 455/556.1 |
| 2003/0020685 A1* | 1/2003 | Richley et al. | 345/105 |
| 2003/0038786 A1 | 2/2003 | Nguyen et al. | |
| 2003/0222149 A1 | 12/2003 | Solomon et al. | |
| 2004/0012953 A1 | 1/2004 | Clemente et al. | |
| 2004/0203502 A1* | 10/2004 | Dietrich et al. | 455/90.3 |
| 2004/0248621 A1 | 12/2004 | Schon | |
| 2005/0179653 A1 | 8/2005 | Hamon | |
| 2005/0286212 A1 | 12/2005 | Brignone et al. | |
| 2006/0256090 A1 | 11/2006 | Huppi | |
| 2006/0284852 A1 | 12/2006 | Hofmeister et al. | |
| 2008/0024453 A1 | 1/2008 | Webb et al. | |
| 2008/0039009 A1* | 2/2008 | Symons | G06F 1/1616 455/3.06 |
| 2008/0046625 A1 | 2/2008 | Spano et al. | |
| 2008/0072896 A1 | 3/2008 | Setzer et al. | |
| 2008/0165141 A1 | 7/2008 | Christie | |
| 2009/0061947 A1 | 3/2009 | Park et al. | |
| 2009/0153289 A1 | 6/2009 | Hope et al. | |
| 2009/0251406 A1 | 10/2009 | Seibert et al. | |
| 2009/0256817 A1* | 10/2009 | Perlin et al. | 345/174 |
| 2009/0314400 A1 | 12/2009 | Liu | |
| 2010/0045628 A1* | 2/2010 | Gettemy et al. | 345/173 |
| 2010/0060593 A1* | 3/2010 | Krah | 345/173 |
| 2010/0097322 A1 | 4/2010 | Hu et al. | |
| 2010/0117629 A1 | 5/2010 | Lombardi et al. | |
| 2010/0156676 A1 | 6/2010 | Mooring et al. | |
| 2010/0227640 A1* | 9/2010 | Kim et al. | 455/550.1 |
| 2010/0245221 A1 | 9/2010 | Khan | |
| 2010/0283742 A1 | 11/2010 | Lam | |
| 2011/0039603 A1* | 2/2011 | Kim | G06F 1/1652 455/566 |
| 2011/0043444 A1* | 2/2011 | Pun | G06F 1/1677 345/156 |
| 2011/0090626 A1 | 4/2011 | Hoellwarth et al. | |
| 2011/0122594 A1* | 5/2011 | Griffin | 361/810 |
| 2011/0147398 A1 | 6/2011 | Ahee et al. | |
| 2011/0153739 A1 | 6/2011 | McCoy | |
| 2011/0192857 A1 | 8/2011 | Rothbaum et al. | |
| 2011/0210834 A1 | 9/2011 | Pasquero et al. | |
| 2011/0241974 A1 | 10/2011 | Manning | |
| 2011/0260976 A1* | 10/2011 | Larsen et al. | 345/168 |
| 2011/0273819 A1* | 11/2011 | Sokola | G06F 1/1626 361/679.01 |
| 2011/0297564 A1 | 12/2011 | Kim et al. | |
| 2011/0303741 A1 | 12/2011 | Bolton et al. | |
| 2011/0316655 A1 | 12/2011 | Mehraban et al. | |
| 2012/0013552 A1 | 1/2012 | Ahn | |
| 2012/0019674 A1 | 1/2012 | Ohnishi et al. | |
| 2012/0038570 A1 | 2/2012 | Delaporte | |
| 2012/0066865 A1 | 3/2012 | Lauder et al. | |
| 2012/0066873 A1 | 3/2012 | Lauder et al. | |
| 2012/0068798 A1 | 3/2012 | Lauder et al. | |
| 2012/0069502 A1 | 3/2012 | Lauder et al. | |
| 2012/0072167 A1 | 3/2012 | Cretella, Jr. et al. | |
| 2012/0098755 A1 | 4/2012 | Lin et al. | |
| 2012/0109455 A1 | 5/2012 | Newman et al. | |
| 2012/0194308 A1 | 8/2012 | Lauder et al. | |
| 2012/0194448 A1 | 8/2012 | Rothkopf | |
| 2012/0194997 A1 | 8/2012 | McClure et al. | |
| 2012/0231847 A2 | 9/2012 | Dodge et al. | |
| 2012/0235930 A1 | 9/2012 | Lazaridis et al. | |
| 2012/0260220 A1 | 10/2012 | Griffin | |
| 2012/0268891 A1 | 10/2012 | Cencioni | |
| 2013/0021266 A1 | 1/2013 | Selim | |
| 2013/0088431 A1 | 4/2013 | Ballagas et al. | |
| 2013/0127724 A1 | 5/2013 | Liu | |
| 2013/0149964 A1 | 6/2013 | Kreiner | |
| 2013/0166790 A1 | 6/2013 | Lee et al. | |
| 2013/0187894 A1 | 7/2013 | Ladouceur et al. | |
| 2013/0214887 A1 | 8/2013 | Lauder et al. | |
| 2013/0215061 A1 | 8/2013 | Rydenhag et al. | |
| 2013/0222323 A1 | 8/2013 | McKenzie | |
| 2013/0227495 A1 | 8/2013 | Rydenhag et al. | |
| 2013/0233762 A1 | 9/2013 | Balaji et al. | |
| 2013/0249806 A1 | 9/2013 | Crisan | |
| 2013/0278566 A1 | 10/2013 | Aldana | |
| 2013/0328825 A1 | 12/2013 | Brown et al. | |
| 2013/0328917 A1 | 12/2013 | Zambetti et al. | |
| 2014/0043748 A1 | 2/2014 | Sartee et al. | |
| 2014/0208333 A1 | 7/2014 | Beals et al. | |
| 2014/0332441 A1 | 11/2014 | Jayetileke et al. | |
| 2014/0333431 A1 | 11/2014 | Abdelsamie et al. | |
| 2014/0362506 A1 | 12/2014 | Whitt, III et al. | |
| 2015/0026623 A1 | 1/2015 | Horne | |
| 2015/0077372 A1 | 3/2015 | Smith et al. | |
| 2015/0154935 A1 | 6/2015 | Won | |

FOREIGN PATENT DOCUMENTS

| | | |
|---|---|---|
| CN | 102147643 A | 8/2011 |
| CN | 102156510 | 8/2011 |
| CN | 102261597 A | 11/2011 |
| EP | 2431835 A2 | 3/2012 |
| KR | 20120032944 A | 4/2012 |
| TW | 200914914 A | 4/2009 |
| TW | 201325387 A | 6/2013 |
| WO | WO03103174 A1 | 12/2003 |
| WO | WO2010028405 A1 | 3/2010 |
| WO | WO 2012-036891 | 3/2012 |
| WO | WO2012036710 A1 | 3/2012 |
| WO | WO2012106216 A2 | 8/2012 |

OTHER PUBLICATIONS

"Printechnologics," www.printechnologics.com, 2011.
PCT/US2012/057032—International Search Report and Written Opinion mailed Mar. 29, 2013.
Anonymous: "iPad 2 Smart Cover Teardown—iFixit", Mar. 16, 2011, retrieved from the Internet: URL:https://www.ifixit.com/Teardown/Ipad+2+Smart+Cover+Teardown/5089 (retrieved on Dec. 15, 2014).
European Patent Application No. 12836724.0—Supplementary European Search Report dated Jan. 8, 2015.
Taiwanese Patent Application No. 102120404—Office Action dated Dec. 3, 2015.
Vliscrosoft, Windows Media Player 11 in Wikipedia 2006.
"Kayla Knight, Responsive Web Design: What It Is and How to Use It", Jan. 12, 2011, https://www.smashingmagazine.com/2011/01/guidelines-for-responsive-web-design/.
International Search Report and Written Opinion mailed Aug. 14, 2013 in PCT/US2012/054668.
International Search Report and Written Opinion mailed Nov. 13, 2013 in PCT/US2013/052793.
Dutch patent application No. 2013177—Search Report dated Mar. 30, 2015.
International Search Report and Written Opinion mailed Oct. 21, 2014 for PCT Application No. PCT/US2014/046470.

(56) References Cited

OTHER PUBLICATIONS

Chinese Application for Invention No. 201210586186.4—First Office Action dated Aug. 12, 2015.
Chinese Application for Invention No. 201310339083.2—First Office Action dated Feb. 3, 2016.
European Patent Application No. 12836724.0—Office Action dated Mar. 14, 2016.
European Application No. 13171099.8—Communication pursuant to Rules 70(2) and 70a(2) EPC and reference to Rule 39(1) EPC dated Apr. 12, 2016.
Taiwanese Patent Application No. 103124156—Office Action and Search Report dated Jun. 1, 2016.
U.S. Appl. No. 14/497,185—Office Action dated Apr. 14, 2016.

* cited by examiner

COVER FOR A TABLET DEVICE

FIELD OF THE DESCRIBED EMBODIMENTS

The described embodiments generally relate to accessory devices used with portable electronic devices. More particularly, the present embodiments describe passive and active circuits that can be used individually or in combination to identify specific characteristics of the accessory device. The identified characteristics can be used by the portable electronic device to alter an operating state of the electronic device, identify specific features of the accessory device, and so forth.

DESCRIPTION OF THE RELATED ART

Recent advances in portable computing includes the introduction of hand held electronic devices and computing platforms along the lines of the iPad™ tablet manufactured by Apple Inc. of Cupertino, Calif. These handheld computing devices can be configured such that a substantial portion of the electronic device takes the form of a display used for presenting visual content leaving little available space for an attachment mechanism that can be used for attaching an accessory device.

The display can include various user interface features that can interact with external stimuli to convey information from an end user, for example, and processing circuitry in the hand held computing device. For example, the display can include touch sensitive elements that can be used to enable various multi-touch (MT) functions. When the accessory device takes the form of a cover, the handheld computing device can be operable in modes consistent with the presence of the cover. For example, when the handheld computing device has a display, the presence of the cover can render the display unviewable. In order to save power, the unviewable display can be rendered temporarily inoperable until the cover is moved or otherwise repositioned to expose the display.

Therefore, accurate and reliable techniques for determining a current status of an accessory device by an electronic device to which it is connected are desired.

SUMMARY OF THE DESCRIBED EMBODIMENTS

This paper describes various embodiments that relate to a system, method, and apparatus for passively providing information from an accessory device to a host device. In one embodiment, the accessory device takes the form of a protective cover and the host device takes the form of an tablet computer.

In one embodiment, a consumer electronic product is described. The consumer electronic product consumer electronic product includes at least an accessory device. The accessory device includes a flap portion having at least a passive information element associated with accessory device information. The consumer electronic product also includes an electronic device attached to the accessory device that includes a display, and a detection mechanism that detects the presence of the passive information element only when the flap portion is in proximity to the display. The detection mechanism provides the accessory device information associated with the detected passive information element to the processor that uses the accessory device information to alter an operating state of the electronic device.

In another embodiment a method for altering an operating state of an electronic device in accordance with accessory device information associated with an accessory device is described. The method is carried out by performing at least the following operations: detecting the passive information element by a detection mechanism in the electronic device, determining the accessory device information based upon the detecting, and altering the operating state of the electronic device in accordance with the accessory device information.

Non-transitory computer readable medium for altering an operating state of an electronic device having a processor and a display are described. The computer readable medium includes at least computer code for detecting the passive information element by a detection mechanism in the electronic device, computer code for determining accessory device information based upon the detecting of the passive information element, and computer code for altering the operating state of the electronic device in accordance with the accessory device information.

In yet another embodiment, an accessory device is described. The accessory device includes an attachment mechanism for attaching the accessory device to an electronic device having a display and a processor. The accessory device includes at least a flap portion having a size and shape in accordance with the display and an information element. In the described embodiment, the information element is associated with accessory device information such that when the information element is detected by a detection mechanism in the electronic device. The detection mechanism provides the accessory device information to the processor. The processor uses the accessory device information to alter an operating state of the electronic device. Generally, the detection occurs only when the flap portion and the display are in close proximity to each other.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF SELECTED EMBODIMENTS

Figure 1:
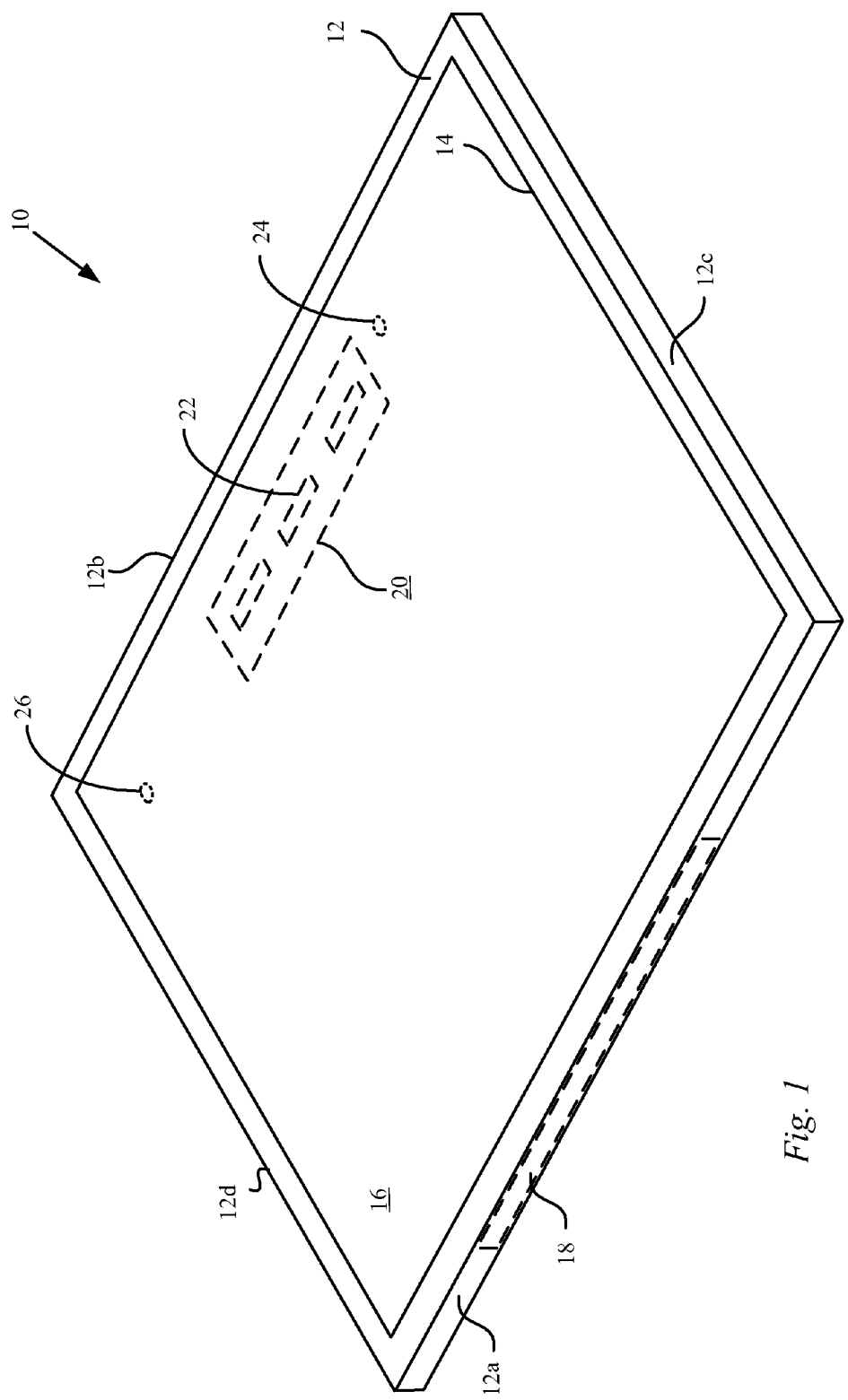
FIG. 1 shows a top perspective view of an electronic device in accordance with the described embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following description relates in general to a mechanism that can be used to identify characteristics of an accessory device used with an electronic device. In a particular embodiment, the accessory device takes the form of a protective cover pivotally connected to the electronic device in the form of a tablet device having a display. In one embodiment, the display is configured to sense externally applied stimuli, such as a touch event, and in response, provide information that can be used by the electronic device. For example, the display can include multi-touch (MT) functionality well suited for recognizing concurrently applied multiple input events. In one embodiment, the protective cover has a flap portion having a size and shape in accordance with the display. In a particular embodiment, the flap portion can be pivotally attached to a hinge portion. In this way, when coupled with the tablet device, the flap portion can rotate about the hinge portion in one direction to bring the flap portion in substantial contact with the display in a closed configuration. Conversely, the flap portion can pivot about the hinge assembly in the other direction to expose the display, or a portion thereof, in an open configuration. In one aspect of the open configuration, the flap portion can rotate about 360 degrees about the hinge portion in such a way that the flap portion can come into contact with a rear portion of the tablet device.

The protective cover can provide protection to certain aspects (such as a display) of the tablet device while enhancing the overall look and feel of the tablet device. The protective cover can include electronic circuits or other elements (passive or active) that can cooperate with electronic elements in the tablet device. As part of that cooperation, signals can be passed between the protective cover and the tablet device that can, for example, be used to modify operations of the tablet device, operations of electronic circuits or elements of the protective cover, and so forth. In one embodiment, the tablet device can operate in a closed cover mode when the protective cover is detected to be in the closed configuration and an open cover mode otherwise.

In one embodiment, the display can include a touch sensitive surface that can react to a plurality of conductive elements incorporated into the protective cover. The touch sensitive surface can include a number of capacitive elements that can capacitively couple with an object, or objects, on or near the protective layer of the display. The capacitive coupling can, in turn, provide signals that can be evaluated by a processor in the tablet device that can be used by an end-user, for example, in controlling certain aspects of the operation of the tablet device. In one embodiment, the object, or objects, can take the form of electrically conductive elements embedded in the flap of the protective cover. In this way, when the protective cover is brought near or into contact with the protective layer of the display, the electrically conductive elements can interact with the capacitive elements providing signals to the processor.

In one embodiment, the signals provided to the processor can correspond to a size, position, and shape of the electrically conductive objects. Therefore, the size, position, and shape of the electrically conductive objects can be associated with information that can be used by the processor. The information can, for example, be used by the processor to determine aspects of the protective cover based upon information associated with specific configurations of the conductive objects. For example, an orientation of a particular conductive object embedded in the flap can be associated with an information element, such as a bit (i.e., "0" or "1"). For example, a "leftward" tilt can be associated with "0" and a "rightward" tilt can be associated with "1". It should be noted, however, that in order to avoid any ambiguity, the relative angles of the rightward and leftward tilts should be maximized in relation to each other. For example, having tilt angles of +45° and −45° can be well suited to maximize the differential signal and reduce any interpretation error. Accordingly, a group of conductive objects having a coordinated relationship to each other can passively convey information to the processor that can be used to, for example, identify specific aspects of the protective cover. Such aspects can include, for example, color, type, style, and so forth.

In one embodiment, the conductive elements can be metallic. For example, the metallic elements can be formed of aluminum. Besides being a good conductor, aluminum has the added advantages of being lightweight, inexpensive, and easy to fabricate. It should be noted that the metallic elements can also take many shapes. For example, the metallic elements can be circular, square, rectangular, etc. In some cases, however, it has been determined that in most instances, the metallic elements are ungrounded (i.e., "float") since in most implementations (but not all), the metallic elements do not directly connect to a ground plane, such as a chassis ground provided by the tablet device. In this case where the metallic element is not grounded, the capacitive signal can reduced over those signals provided when the metallic element is grounded. In the ungrounded case, therefore, it has been found that detection of the ungrounded metallic element can be optimized when the metallic element takes on a specific shape that can be associated with a specific signal, or class of signals. For example, when the touch screen includes a rectangular grid of capacitive detection nodes and the metallic element takes on the shape of an elongated rectangle (also referred to as a metal strip) having a diagonal orientation with respect to the capacitive detection grid, the signal produced by the capacitive coupling between the diagonal metal strip and the capacitive detection nodes can be readily distinguished and therefore reliably detected.

In this way, any number of characteristics of the metallic strips such as the size, shape, orientation, position, etc. of the diagonal metallic strips can be used to passively convey information from the flap portion of the protective cover to the processor. This information can then be used by the processor to execute instructions that can be used to carry out any number of operations by the tablet device. The information can also be used to convey information specific to the protective cover (such as type, color, style, specific serial number). For example, providing N metallic strips can provide $2^N$ bits of information (assuming that the relative orientation of the metallic strip is associated with a particular value of a bit). Other characteristics besides physical orientation can be used to convey information. For example, relative size, shape, and ability to form a capacitive coupling with a capacitive detection node, to name but a few, can be used independently or in combination to represent information that can be used by the tablet device.

The electronic device can include a number of sensors in addition to those used to detect the conductive elements in the flap portion of the protective cover. These additional sensors can include, for example, a Hall Effect sensor (HFX) for detecting and responding to a saturating magnetic field, an ambient light sensor (ALS) for detecting ambient light levels in vicinity of the tablet device, and an image capture device such as a camera (still or video). In one embodiment, the ALS can include a photosensitive circuit (such as a photodiode) that can respond to varying levels of incident light, typically in the form of ambient light. Typically, the ALS is configured to detect ambient light. The ALS can, however, be configured to respond to the detection of the ambient light in many ways. For example, the ALS can respond by providing a signal whenever the photosensitive circuit within the ALS detects an amount (i.e., intensity) of ambient light greater than a pre-defined amount of ambient light. In other words, the threshold amount of ambient light can be a defined threshold level that can be constant or variable depending upon the situation at hand.

In some situations, the information provided by the conductive elements in the flap can be used in conjunction with the signals provided by the other sensors all of which can be evaluated by the processor. For example, when the flap portion is initially placed upon the protective layer, a magnetic element in the flap portion can be detected by the HFX causing the processor to disable the display. The disabling of the display not only disables the image producing aspect of the display but any touch sensing aspect as well. Therefore, in order to assure consistent pattern recognition by the touch sensitive portion of the display with regards to the conductive elements in the flap, the processor will generally provide an amount of time between the HFX detecting the magnetic element in the flap and the disabling of the display to allow a first detected pattern to be stored in a data storage device. In another embodiment, while in the closed configuration mode, the processor can periodically enable the display for a short period of time long enough to reliably capture the conductive element pattern embedded in the cover. Although this approach can be expected to use more power, the reliability of the pattern detection can be improved.

These and other embodiments are discussed below with reference to FIGS. 1-15. However, those skilled in the art will readily appreciate that the detailed description given herein with respect to these figures is for explanatory purposes only and should not be construed as limiting.

The electronic device can take many forms. For the remainder of this discussion, the electronic device is described in terms of a handheld portable computing device. Accordingly, FIG. 1 shows a top perspective view of electronic device 10 in accordance with the described embodiments. Electronic device 10 can process data and more particularly media data such as audio, visual, images, etc. By way of example, electronic device 10 can generally correspond to a device that can perform as a smart phone, a music player, a game player, a visual player, a personal digital assistant (PDA), a tablet device and the like. Electronic device 10 can also be hand held. With regards to being handheld, electronic device 10 can be held in one hand while being operated by the other hand (i.e., no reference surface such as a desktop is needed). Hence, electronic device 10 can be held in one hand while operational input commands can be provided by the other hand. The operational input commands can include operating a volume switch, a hold switch, or by providing inputs to a touch sensitive surface such as a touch sensitive display device or a touch pad.

Electronic device 10 can include housing 12. In some embodiments, housing 12 can take the form of a single piece housing formed of any number of materials such as plastic or non-magnetic metal which can be forged, molded, or otherwise formed into a desired shape. In those cases where electronic device 10 has a metal housing and incorporates radio frequency (RF) based functionality, a portion of housing 12 can include radio transparent materials such as ceramic, or plastic. Housing 12 can be configured to enclose a number of internal components. For example, housing 12 can enclose and support various structural and electrical components (including integrated circuit chips) to provide computing operations for electronic device 10. The integrated circuits can take the form of chips, chip sets, or modules any of which can be surface mounted to a printed circuit board, or PCB, or other support structure. For example, a main logic board (MLB) can have integrated circuits mounted thereon that can include at least a microprocessor, semi-conductor memory (such as FLASH), and various support circuits and so on. Housing 12 can include opening 14 for placing internal components and as necessary can be sized to accommodate display 16 for presenting visual content, display 16 being covered and protected by a protective cover layer. In some cases, display 16 can be touch sensitive allowing tactile inputs that can be used to provide control signals to electronic device 10. In some cases, display 16 can be a large prominent display area that covers a majority of the real estate on the front of the electronic device.

Electronic device 10 can include a magnetic attachment system that can be used to magnetically attach electronic device 10 to at least one other suitably configured object. The magnetic attachment system can include a number of magnetic attachment features distributed within and in some cases connected to housing 12. For example, the magnetic attachment system can include first magnetic attachment feature 18 and second magnetic attachment feature 20 located on different sides of electronic device 10. In particular, first magnetic attachment feature 18 can be located in proximity to side wall 12a of housing 12. Second magnetic attachment feature 20 can be located within opening 14 near side wall 12b of housing 12. In those embodiments where electronic device 10 includes a display with cover glass substantially filling opening 14, second attachment feature 20 can be placed beneath the cover layer.

The placement of first magnetic attachment feature 18 at side wall 12a can facilitate the use of magnetic attachment feature 18 to magnetically attach electronic device 10 to another suitably configured object such as another electronic device or an accessory device. Accordingly, without loss of generality, first magnetic attachment feature 18 will henceforth be referred to as device attachment feature 18. The placement of second magnetic attachment feature 20, on the other hand, can facilitate the use of second magnetic attachment feature 20 to secure aspects of another device attached to electronic device 10 by way of device attachment feature 18. In this way, the overall attachment between the other device and electronic device 10 can be more secure than attaching through first attachment feature 18 alone. Accordingly, and again without loss of generality, second attachment feature 20 will henceforth be referred to as securing attachment feature 20. Securing attachment feature 20 can include one or more of magnetic elements 22. When a plurality of magnetic elements is used, the arrangement of the plurality of magnetic elements can be widely varied and can magnetically interact with a cooperating feature on another device. In one embodiment, the plurality of magnetic elements associated with securing feature 20 can assist in securing at least a portion of another device otherwise attached to electronic device 10 by way of device attachment feature 18. Electronic device 10 can also include Hall Effect sensor 24 and magnetometer circuit 26 in the form of onboard compass 26.

Figure 2A:
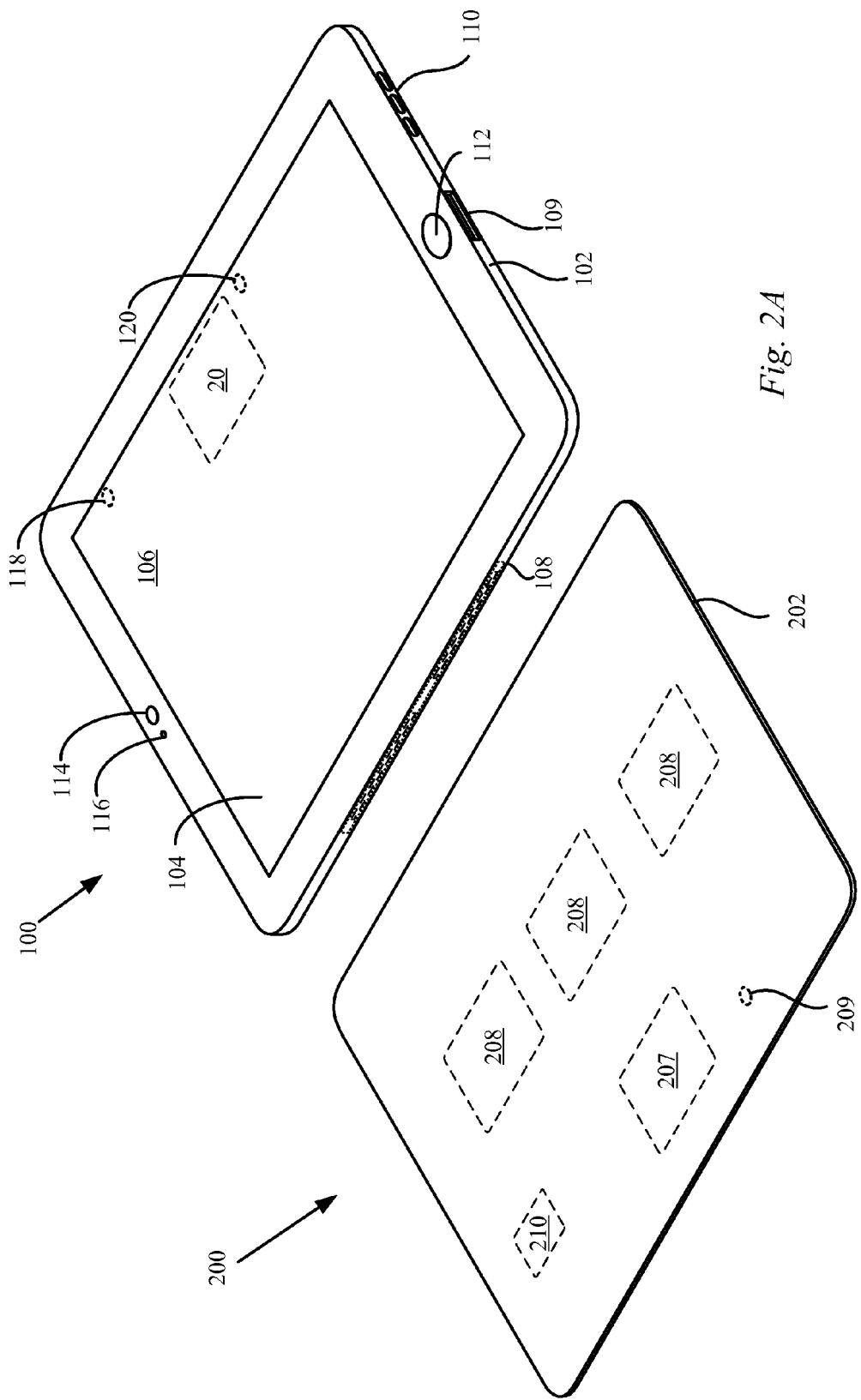
FIG. 2A shows a first perspective view of the electronic device in the form of a tablet device and the accessory device in the form of a protective cover.
Figure 2B:
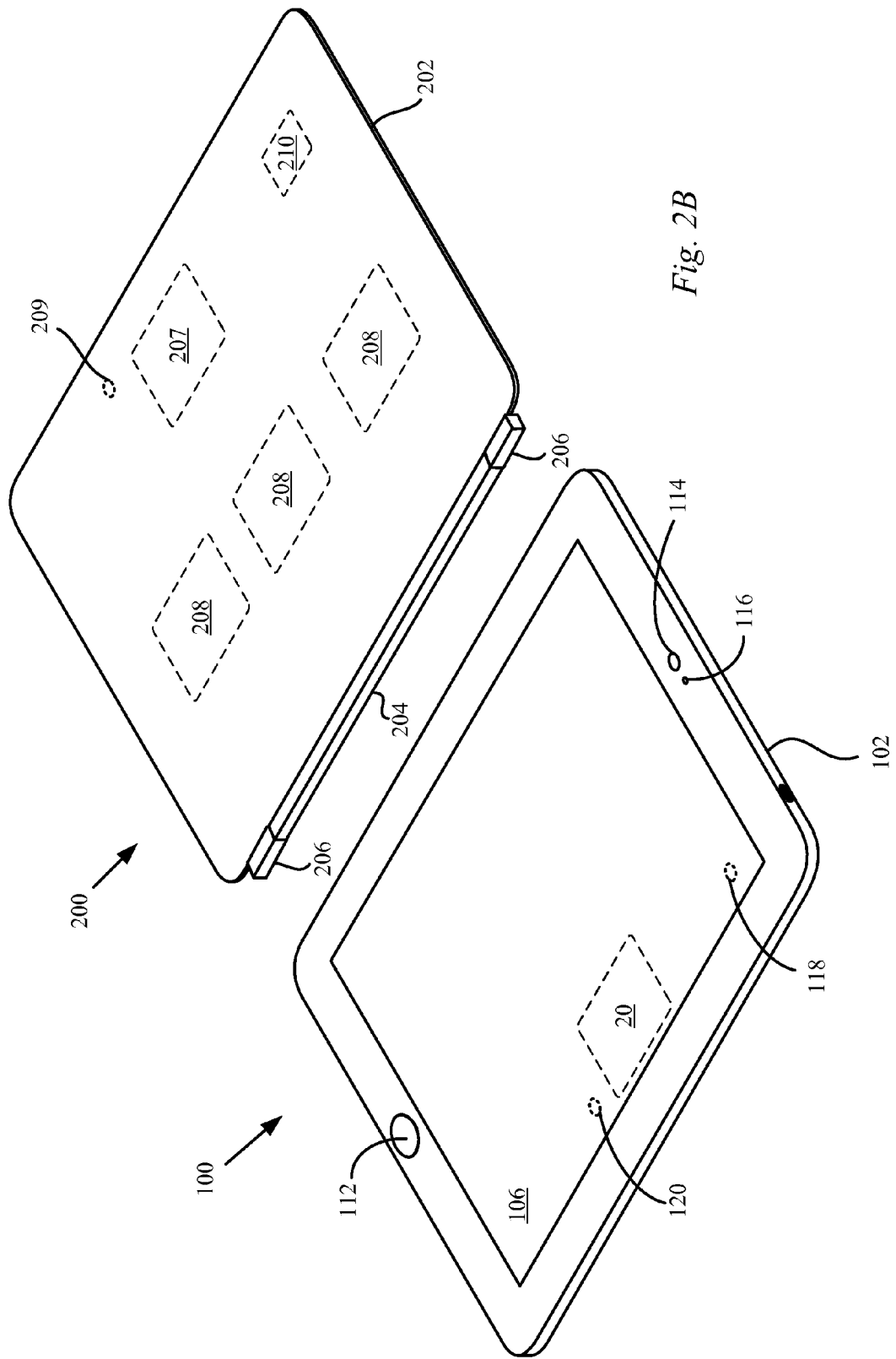
FIG. 2B shows a second perspective view of the electronic device in the form of a tablet device and the accessory device in the form of a protective cover.

FIG. 2A and FIG. 2B show electronic device 100 presented in terms of tablet device 100 and accessory device 200 is shown as protective cover 200 each in perspective top views. These elements may generally correspond to any of those previously mentioned. In particular, FIGS. 2A and 2B shows two perspective views of tablet device 100 and protective cover 200 in the open configuration. For example, FIG. 2A shows device attachment feature 108 included in tablet device 100 and its relationship to tablet device 100. FIG. 2B, on the other hand, is the view presented in FIG. 2A rotated about 180° to provide a second view of attachment feature 202 and its relationship with protective cover 200.

Tablet device 100 can take the form of a tablet computing device such as the iPad™ manufactured by Apple Inc. of Cupertino, Calif. Referring now to FIG. 2A, tablet device 100 can include housing 102 that can enclose and support device attachment feature 108. In order to not interfere with the magnetic field generated by device attachment feature 108, at least that portion of housing 102 nearest device attachment feature 108 can be formed of any number of non-magnetic materials such as plastic or non-magnetic metal such as aluminum. Housing 102 can also enclose and support internally various structural and electrical components (including integrated circuit chips and other circuitry) to provide computing operations for tablet device 100. Housing 102 can include opening 104 for placing internal components and can be sized to accommodate a display assembly or system suitable for providing a user with at least visual content as for example via a display. In some cases, the display assembly can include touch sensitive capabilities providing the user with the ability to provide tactile inputs to tablet device 100 using touch inputs. The display assembly can be formed of a number of layers including a topmost layer taking the form of transparent cover glass 106 formed of polycarbonate or other appropriate plastic or highly polished glass. Using highly polished glass, cover glass 106 can substantially fill opening 104.

Although not shown, the display assembly underlying cover glass 106 can be used to display images using any suitable display technology, such as LCD, LED, OLED, electronic or e-inks, and so on. The display assembly can be placed and secured within the cavity using a variety of mechanisms. In one embodiment, the display assembly is snapped into the cavity. It can be placed flush with the adjacent portion of the housing. In this way, the display can present visual content that can include visual, still images, as well as icons such as graphical user interface (GUI) that can provide information the user (e.g., text, objects, graphics) as well as receive user provided inputs. In some cases, displayed icons can be moved by a user to a more convenient location on the display.

In some embodiments, a display mask can be applied to, or incorporated within or under cover glass 106. The display mask can be used to accent an unmasked portion of the display used to present visual content and can be used to make less obvious device attachment feature 108 and securing attachment feature 20. Tablet device 100 can include various ports that can be used to pass information between tablet device 100 and the external environment. In particular, data port 109 can facilitate the transfer of data and power whereas speakers 110 can be used to output audio content. Home button 112 can be used to provide an input signal that can be used by a processor included in tablet device 100. The processor can use the signal from home button 112 to alter the operating state of tablet device 100. For example, home button 112 can be used to reset a currently active page presented by the display assembly. Tablet device 100 can also include camera assembly 114 arranged to capture an image or images. Tablet device 100 can also include ambient light sensor 116 (ALS) used to detect a level of ambient light. In one embodiment ALS 116 can be used to set a brightness level of the display assembly. For example, in a darker environment with little ambient light, the readings from ALS 116 can cause a processor in tablet device 100 to dim the display assembly. In a brighter environment, the display assembly can be made brighter. Tablet device can further include compass 118 used to detect external magnetic fields that can help in the determination of a position of tablet device 100. Tablet device 100 can also include Hall Effect (HFX) sensor 120 that can be used to detect the presence of a magnetic element in when cover 200 is placed on top of tablet device 100 in a closed configuration. An accelerometer and gyroscope (not shown) can determine any dynamic changes in the position and orientation of tablet device 100 in real time.

Figure 3A:
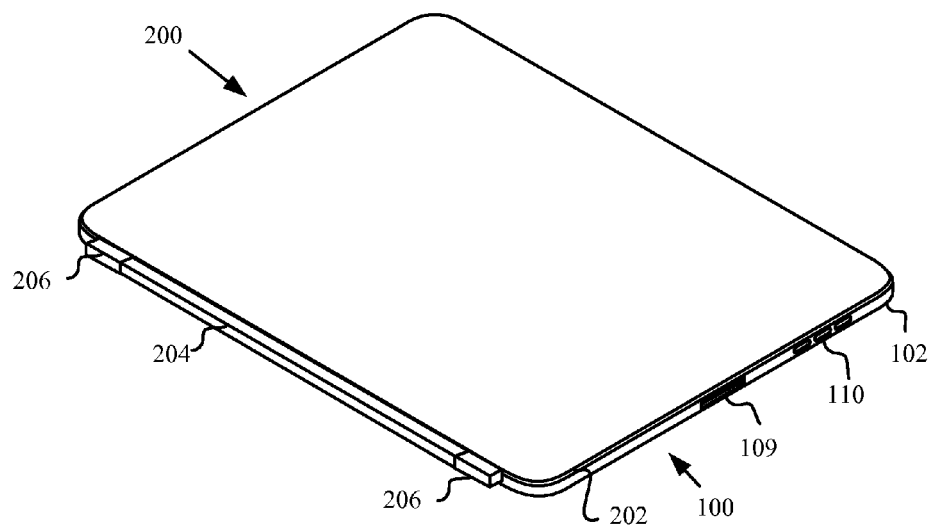
FIG. 3A shows a closed configuration of the cooperating system formed by the tablet device and protective cover shown in FIGS. 2A and 2B.

Protective cover 200 can have a look and feel that complements that of the tablet device 100 adding to overall look and feel of tablet device 100. Protective cover 200 is shown in FIGS. 2A and 2B attached to tablet device 100 in an open configuration in which cover glass 106 is fully viewable. Protective cover 200 can include flap 202. In one embodiment, flap 202 can have a size and shape in accordance with cover glass 106. Flap 202 can be pivotally connected to accessory attachment feature 204 by way of hinge assembly 206 each shown in FIG. 2B. In this way, flap 202 can rotate about pivot line 211. The magnetic attachment force between attachment feature 204 and device attachment feature 108 can maintain protective cover 200 and tablet device 100 in a proper orientation and placement vis-a-vis flap 202 and cover glass 106. By proper orientation it is meant that protective cover 200 can only properly attach to tablet device 100 having flap 202 and cover glass 106 aligned in a mating engagement. The mating arrangement between cover glass 106 and flap 202 is such that flap 202 covers substantially all of cover glass 106 when flap 202 is placed in contact with cover glass 106 as shown in FIG. 3A.

Flap 202 can be pivotally connected to hinge assembly 206 that, in turn, can be connected to attachment feature 204. Hinge assembly 206 can, in turn, be coupled to electronic device 100 by way of accessory attachment feature 204. In this way, the flap 202 can be used as a protective cover to protect aspects of electronic device 100 such as a display cover 106. Flap 202 can be formed of various materials such as plastic, cloth, and so forth. Flap 202 can be segmented in such a way that a segment of the flap can be lifted to expose a corresponding portion of the display. Flap 202 can also include a functional element that can cooperate with a corresponding functional element in electronic device 100. In this way, manipulating flap 202 can result in an alteration in the operation of electronic device 100.

Flap 202 can include magnetic material. For example, magnetic elements 207 can be used to magnetically attach to corresponding magnetic attachment feature 20 whereas magnetic element 209 can be used to activate Hall Effect sensor 120 when flap 202 is in position above cover glass 106. In this way, Hall Effect sensor 120 can respond by generating a signal that can, in turn, be used to alter an operating state of electronic device 100. Since the cover can be easily attached directly to the housing of the tablet device without fasteners, the flap 202 can essentially conform to the shape of electronic device 100. In this way, the cover 200 will not detract or otherwise obscure the look and feel of electronic device 100. Flap 202 can also include capacitive elements 208 arranged in a defined pattern. Capacitive elements 208 can be detected by a multi-touch (MT) sensitive layer incorporated in display assembly. When flap 202 is placed upon cover glass 106, the MT sensitive layer can respond to the presence of capacitive elements 208 by generating a touch pattern consistent with the defined pattern. The defined pattern can be used to convey information to tablet device 100. The information can include, for example, aspects and characteristics of protective cover 200 such as color, type, style, serial number, and so forth.

In addition to capacitive elements 208, flap 202 can include RFID device 210 that can be used to identify protective cover 200. In particular, when protective cover 200 is in the closed configuration, flap 202 can be in contact with cover glass 106 thereby allowing a RFID sensor within tablet device 100 to "read" RFID device 210. In this way not only can the indication from Hall Effect sensor 120 be corroborated, but an identification of protective cover 200 can also be performed.

Figure 3B:
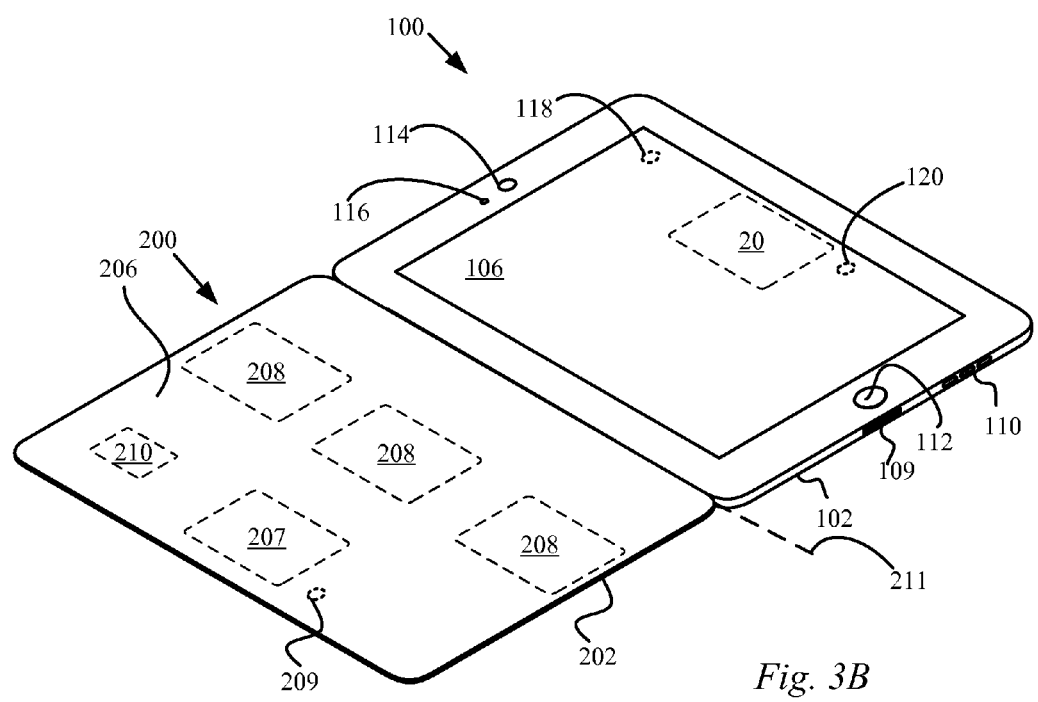
FIG. 3B shows an open configuration of the cooperating system shown in FIG. 3A.

Although FIGS. 3A and 3B show protective cover 200 and tablet device 100 magnetically attached to each other, any form of attachment between flap 200 and tablet device 100 is possible. For example, protective cover 200 can be formed of a sleeve portion pivotally coupled to flap 202. In this way, tablet device 100 can be inserted into the sleeve portion and flap 202 can then pivot to open and closed configurations without the need for magnetic attachment. However, for the remainder of this discussion and without loss of generality, it is presumed that protective cover 200 and tablet device 100 are magnetically attached to each other.

In particular, FIG. 3A shows a closed configuration in which cover glass 106 is fully covered by and in contact with flap 202. Protective cover 200 can pivot about hinge assembly 206 from the closed configuration of FIG. 3A to an open configuration of FIG. 3B. In the closed configuration, inner layer of flap 202 can come in direct contact with cover glass 106. In this way, capacitive elements 208 can be detected by MT circuit disposed within the display assembly beneath cover glass 106. Moreover, the MT circuit can detect a pattern, or signature, corresponding to the pattern of capacitive elements 208. In this way, the detection of the pattern can provide information that can be used to identify various characteristics of protective cover 200. For example, a first pattern can be a pattern of capacitive elements arranged in a pattern that maximizes a difference in capacitive signal between any two adjacent capacitive. One such pattern can be formed of metallic strips placed diagonally with respect to a Cartesian detection grid disposed beneath cover glass 106. In this way, by associating a specific information element (such a binary "1") with a particular orientation, a correlated pattern of metallic strips can be used to passively convey information to the processor in tablet device 100. It should be noted, however, that the need to maximize a differential signal between adjacent capacitive elements can be achieved by varying not only the orientation, but size, shape, material (by varying the electrical properties of the various capacitive elements) and so forth.

Figure 4:
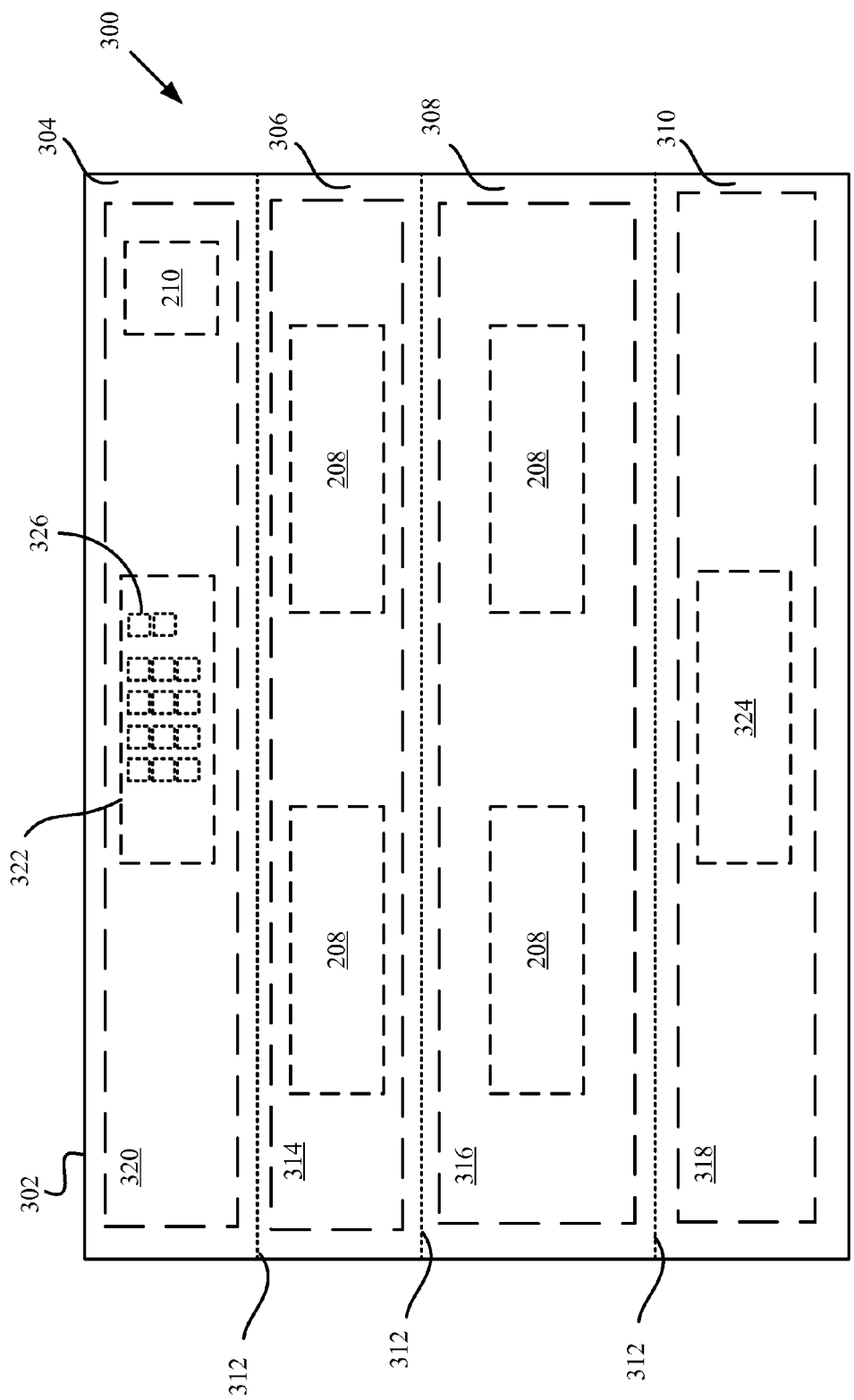
FIG. 4 shows a top view of an embodiment of a segmented cover assembly.

FIG. 4 shows a top view of a specific embodiment of protective cover 200 in the form of segmented cover 300. Segmented cover 300 can include body 302. Body 302 can have a size and shape in accordance with tablet device 100. Body 302 can be formed from a single piece of foldable or pliable material. Body 302 can also be divided into segments separated from each other by a folding region. In this way, the segments can be folded with respect to each other at the folding regions. In one embodiment, body 302 can be formed layers of material attached to one another forming a laminate structure. Each layer can take the form of a single piece of material that can have a size and shape in conformance with body 302. Each layer can also have a size and shape that correspond to only a portion of body 302. For example, a layer of rigid or semi-rigid material about the same size and shape of a segment can be attached to or otherwise associated with the segment.

In another example, a layer of rigid or semi-rigid material having a size and shape in accordance with body 302 can be used to provide segmented cover 300 as a whole with a resilient foundation. It should be noted that the layers can each be formed of materials having desired properties. For example, a layer of segmented cover 300 that comes in contact with delicate surfaces such as glass can be formed of a soft material that will mar or otherwise damage the delicate surface. In another embodiment, a material such as microfiber can be used that can passively clean the delicate surface. On the other hand, a layer that is exposed to the external environment can be formed of a more rugged and durable material such as plastic or leather. In yet another embodiment, capacitive elements 208 can be incorporated within the laminate structure of cover assembly 300.

In a specific embodiment, segmented body 302 can be partitioned into a number of segments 304-310 interspersed with thinner, foldable portions 312. Each of the segments 304-310 can include one or more inserts disposed therein. By way of example, the segments can include a pocket region where the inserts are placed or alternatively the inserts may be embedded within the segments (e.g., insert molding). If pockets used, the pocket region can have a size and shape to accommodate corresponding inserts. The inserts can have various shapes but are most typically shaped to conform to the overall look of segmented body 302 (e.g., rectangular). The inserts can be used to provide structural support for segmented body 302. That is, the inserts can provide stiffness to the cover assembly. In some cases, the inserts may be referred to as stiffeners. As such, the cover assembly is relatively stiff except along the foldable regions that are thinner and do not include the inserts (e.g., allows folding) making segmented cover 300 more robust and easier to handle.

Segments 306, 308, and 310 can include inserts 314, 316, and 318, respectively (shown in dotted lines form). Inserts 314-318 can be formed of rigid or semi-rigid material adding resiliency to body 302. Examples of materials that can be used include plastics, fiber glass, carbon fiber composites, metals, and the like. Segment 304 can include insert 320 also formed of resilient material such as plastic but also arranged to accommodate magnetic elements 322 some of which can interact with magnetic elements in table device 100 and more specifically attachment feature 20. In some embodiments, at least some of magnetic elements 322 can magnetically interact with magnetically attractable element 324 to form useful structures whereas magnetic elements 326 can be used to interact with magnetically sensitive circuits, such as a Hall Effect sensor, included in tablet device 100. Magnetic elements inserts 314-318 can also incorporate capacitive elements 208 that can be sensed by a MT sensitive portion of the display of tablet device 100.

Capacitive elements 208 can be widely varied in both form, material of manufacture, electrical characteristics, and so forth. In this way, an amount of information that can be passively conveyed by capacitive elements 208 can also be widely varied. For example, when capacitive elements 208 are metallic in nature (such as aluminum), the electrical properties of capacitive elements 208 can be varied by altering the thickness of the aluminum that forms each capacitive element 208. By varying the electrical characteristics, the signature detected by the MT detection grid in tablet device 100 can be based at least in part upon the relationship between capacitive signal strength and less on the particular orientation of the capacitive elements.

Figure 5A:
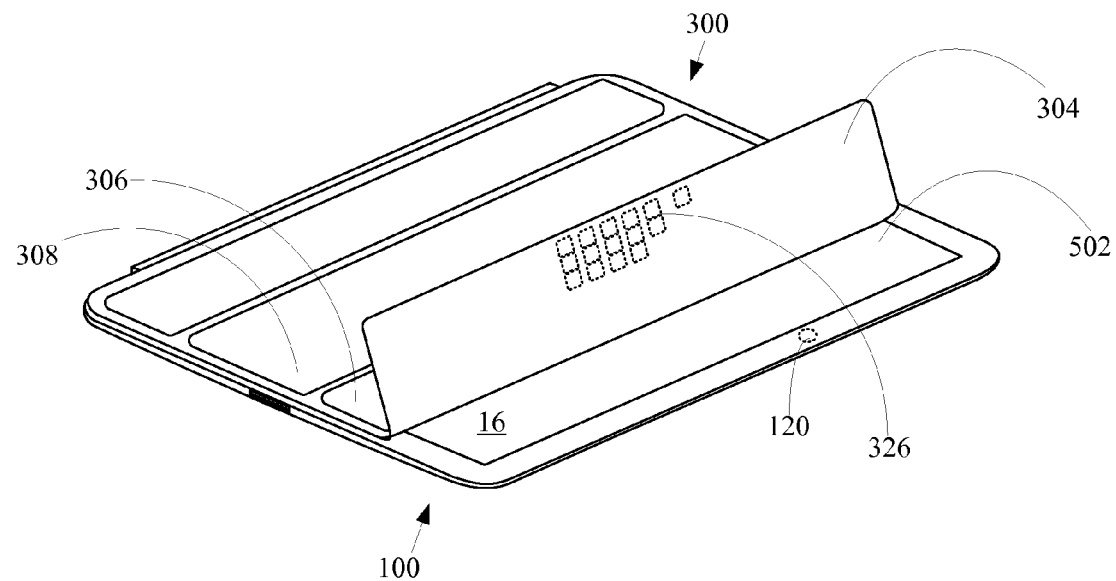
FIG. 5A and FIG. 5B shows segmented cover 300 in partial open configurations with respect to tablet device.
Figure 5B:
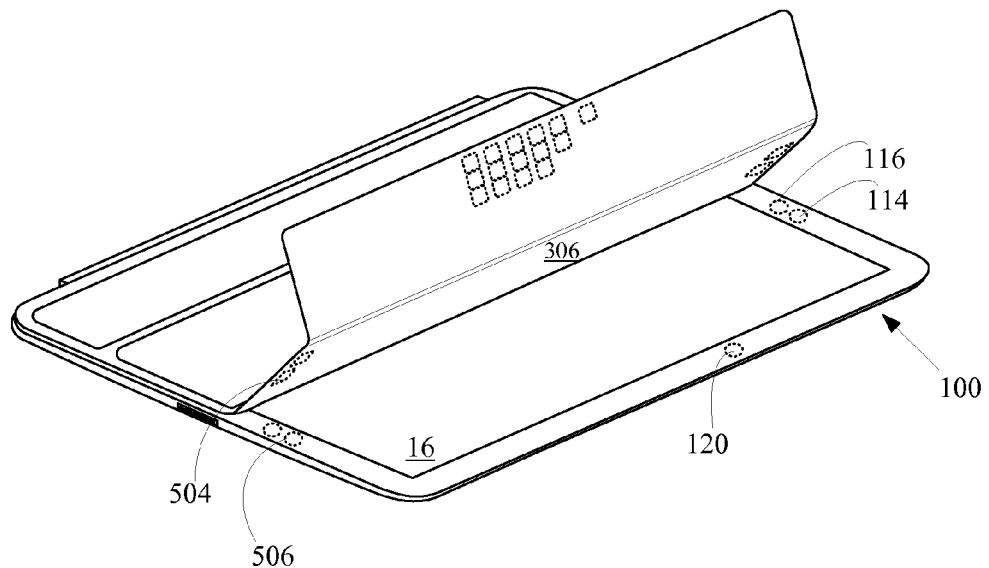

FIG. 5A and FIG. 5B shows segmented cover 300 in partial open configurations with respect to tablet device 100. By partial open configuration it is meant that due to the segmented nature of segmented cover 300, only a portion of protective layer 106 can be exposed at a time. For example, as shown in FIG. 5A, when segment 304 is lifted, portion 502 of display 16 can be viewed. However, since magnetic elements 326 are not detectable by HFX sensor 120, in one embodiment, signals from HFX sensor 120 can be interpreted by a processor in tablet device 100 to enable display 16. In this way, patterns of capacitive elements in those segments (such as segments 306 and 308) that remain in contact with display 16 can be detected. The detected patterns can be used to, for example, identify various characteristics of segmented cover 300. For example, the information included in the detected patterns in segment 306 can provide the processor in tablet device 100 with information related to the relative position of segment 306. For example, by virtue of the fact that the capacitive elements in segment 306 can be detected is a clear indication that segment 306 is in essentially the closed configuration with respect to display 16. However, since HFX sensor 120 is no longer detecting the saturating magnetic field from magnetic elements 326, the processor in tablet device 100 can deduce that only segment 304 is lifted while all other segments remain in contact with display 16.

Therefore, using this information, an operating state of tablet device 100 can be altered by the processor consistent with the fact that only segment 304 is lifted. For example, the processor can display information, such as battery level, time of day, email, etc. only in that portion 502. This "peek" mode can be very useful. Information detected in segment 306 can also be used by tablet device 100 to present specific visual content on portion of display 16 that is viewable. For example, since only a small portion of display 16 is viewable, the information provided by segment 306 can cause tablet device 100 to display visual information suitable only for presentation in the small, viewable portion of display 16. Such suitable visual information can include information icons related to email received, weather conditions and so forth.

FIG. 5B shows another partially open situation where in addition to segment 304, segment 306 has also been lifted. The determination that only segments 304 and 306 can be ascertained when it is determined that capacitive elements 208 in segment 306 are no longer detected whereas capacitive elements 208 in segment 308 can be detected. In this way, additional display resources can be enabled to provide an enhanced display experience. In addition to using capacitive elements, other sensors can be brought into play. For example, ALS 116 and camera assembly 114 can be used separately or in combination to determine that segment 308 has been lifted based upon amounts of ambient light detected (in the case of ALS 116) and/or periodic image capture events by camera assembly 114. In another embodiment, capacitive elements 504 can be placed on the periphery of segmented cover 300 at selected locations that correspond with capacitive detection nodes 506 in tablet device 100. In this way, the ability to capacitively detect capacitive elements 504 by capacitive detection nodes 506 can provide an indication of the status of segmented cover 300 in relation to tablet device 100. In addition to spatial orientation considerations, capacitive elements 208 and 504 can be used to passively convey information to the processor in tablet device 100 for further processing. For example, an identification indicator can be embodied as a pattern of capacitive elements included in capacitive elements 504. The pattern of capacitive elements can provide unique information associated with particular protective covers such a style, color, date of origin, and so forth.

Figure 6:
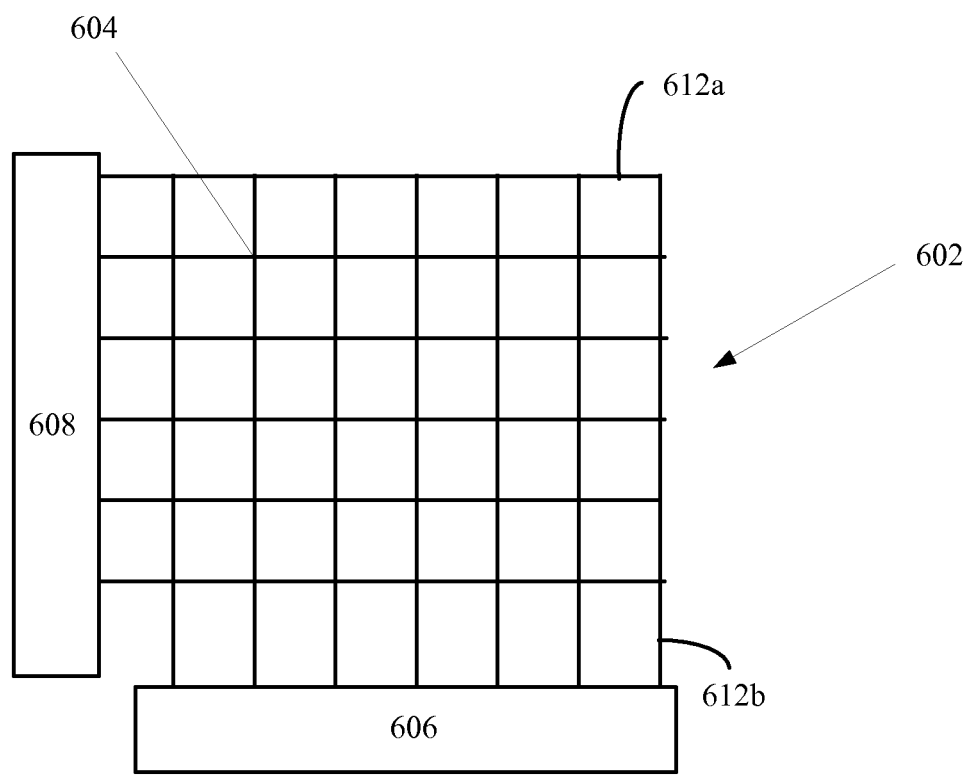
FIGS. 6 and 7 show a multi-touch (MT) sensing arrangement.

In those embodiments where display 16 includes touch sensing functionality, electronic device 10 can include multi-touch (MT) sensing arrangement 600 shown in FIG. 6. MT sensing arrangement 600 can be used for recognizing multiple simultaneous or near-simultaneous touch events. MT sensing arrangement 600 can detect and monitor multiple touch attributes (including, for example, identification, position, velocity, size, shape, and magnitude) across touch sensitive surface 602, at the same time, or nearly the same time, at different times, or over a period of time. Touch sensitive surface 602 can provide a plurality of sensor points, coordinates, or nodes 604 that function substantially independently of one another and that represent different points on a touch sensitive surface. Sensing nodes 604 can be positioned in a grid or a pixel array, with each sensing point capable of generating a signal at the same time. Sensing nodes 604 can be considered as mapping touch sensitive surface 602 into a coordinate system, for example, a Cartesian or polar coordinate system. To produce a touch screen, the capacitance sensing nodes and other associated electrical structures can be formed with a substantially transparent conductive medium, such as indium tin oxide (ITO). The number and configuration of sensing nodes 604 can be varied. The number of sensing nodes 604 generally depends on the desired resolution and sensitivity. In touch-screen applications, the number of sensing nodes 604 can also depend on the desired transparency of the touch screen.

Figure 7:
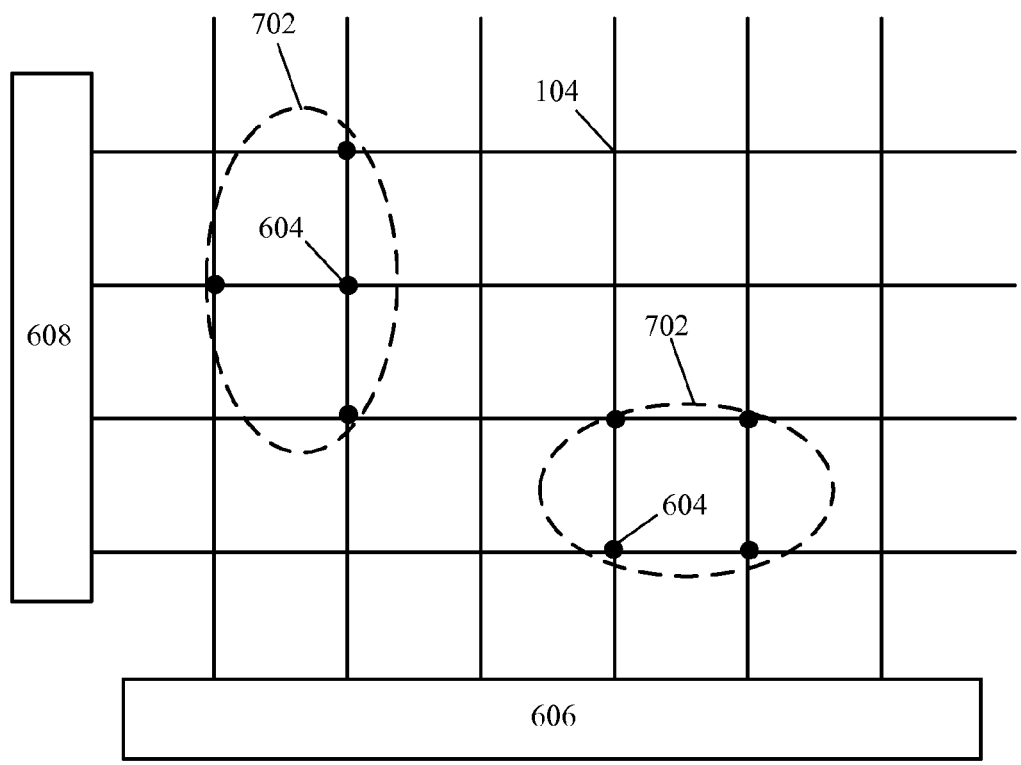

Using a MT sensing arrangement 600, signals generated at nodes 604 of touch sensitive surface 602 can be used to produce an image of the touches at a particular point in time. For example, each object (e.g., finger) in contact with or in proximity to touch sensitive surface 602 can produce contact patch area 702, as illustrated in FIG. 7. Each of contact patch area 702 can cover several nodes 604. Covered nodes 604 can detect the object, while remaining nodes 604 do not. As a result, a pixilated image of the touch surface plane (which can be referred to as a touch image, a MT image, or a proximity image) can be formed. The signals for each contact patch area 702 can be grouped together. Each contact patch area 702 can include high and low points based on the amount of touch at each point. The shape of contact patch area 702, as well as the high and low points within the image, can be used to differentiate contact patch areas 702 that are in close proximity to one another. Furthermore, the current image can be compared to previous images to determine how the objects can be moving over time, and what corresponding action should be performed in a host device as a result thereof.

Returning to FIG. 6, many different sensing technologies can be used in conjunction with these sensing arrangements, including resistive, capacitive, optical, etc. In capacitance-based sensing arrangements, as an object approaches touch-sensitive surface 602, a small capacitance forms between the object and sensing nodes 604 in proximity to the object. By detecting changes in capacitance at each of the sensing nodes 604 caused by this small capacitance, and by noting the position of the sensing nodes, a sensing circuit 606 can detect and monitor multiple touches. The capacitive sensing nodes can be based on self-capacitance or mutual capacitance. In self-capacitance systems, the "self" capacitance of a sensing point is measured relative to some reference, e.g., ground. Sensing nodes 604 can be spatially separated electrodes. These electrodes are coupled to driving circuitry 608 and sensing circuitry 606 by conductive traces 612a (drive lines) and 612b (sense lines). In some self-capacitance embodiments, a single conductive trace to each electrode can be used as both a drive and sense line. In mutual capacitance systems, the "mutual" capacitance between a first electrode and a second electrode can be measured. In mutual capacitance sensing arrangements, the sensing nodes can be formed by the crossings of patterned conductors forming spatially separated lines. For example, driving lines 612a can be formed on a first layer and sensing lines 612b can be formed on a second layer 612b such that the drive and sense lines cross or "intersect" one another at sensing nodes 604. The different layers can be different substrates, different sides of the same substrate, or the same side of a substrate with some dielectric separation. Because the drive and sense lines are separated, there is a capacitive coupling node at each "intersection."

The manner in which the drive and sense lines are arranged can vary. For example, in a Cartesian coordinate system (as illustrated), the drive lines can be formed as horizontal rows, while the sense lines can be formed as vertical columns (or vice versa), thus forming a plurality of nodes that can be considered as having distinct x and y coordinates. Alternatively, in a polar coordinate system, the sense lines can be a plurality of concentric circles with the drive lines being radially extending lines (or vice versa), thus forming a plurality of nodes that can be considered as having distinct r and angle coordinates. In either case, drive lines 612a can be connected to drive circuit 608, and sensing lines 612b can be connected to sensing circuit 606.

During operation, a drive signal (e.g., a periodic voltage) is applied to each drive line 612a. When driven, the charge impressed on drive line 612a can capacitively couple to the intersecting sense lines 612b through nodes 604. This can cause a detectable, measurable current and/or voltage in sense lines 612b. The relationship between the drive signal and the signal appearing on sense lines 612b is a function of the capacitance coupling the drive and sense lines, which, as noted above, can be affected by an object in proximity to node 604. Capacitance sensing circuit (or circuits) 606 can sense sensing lines 612b and can determines the capacitance at each node as described in greater detail below. As discussed above, drive lines 612a were driven one at a time, while the other drive lines were grounded. This process was repeated for each drive line 612a until all the drive lines had been driven, and a touch image (based on capacitance) was built from the sensed results. Once all the lines 612a had been driven, the sequence would repeat to build a series of touch images.

Figure 8:
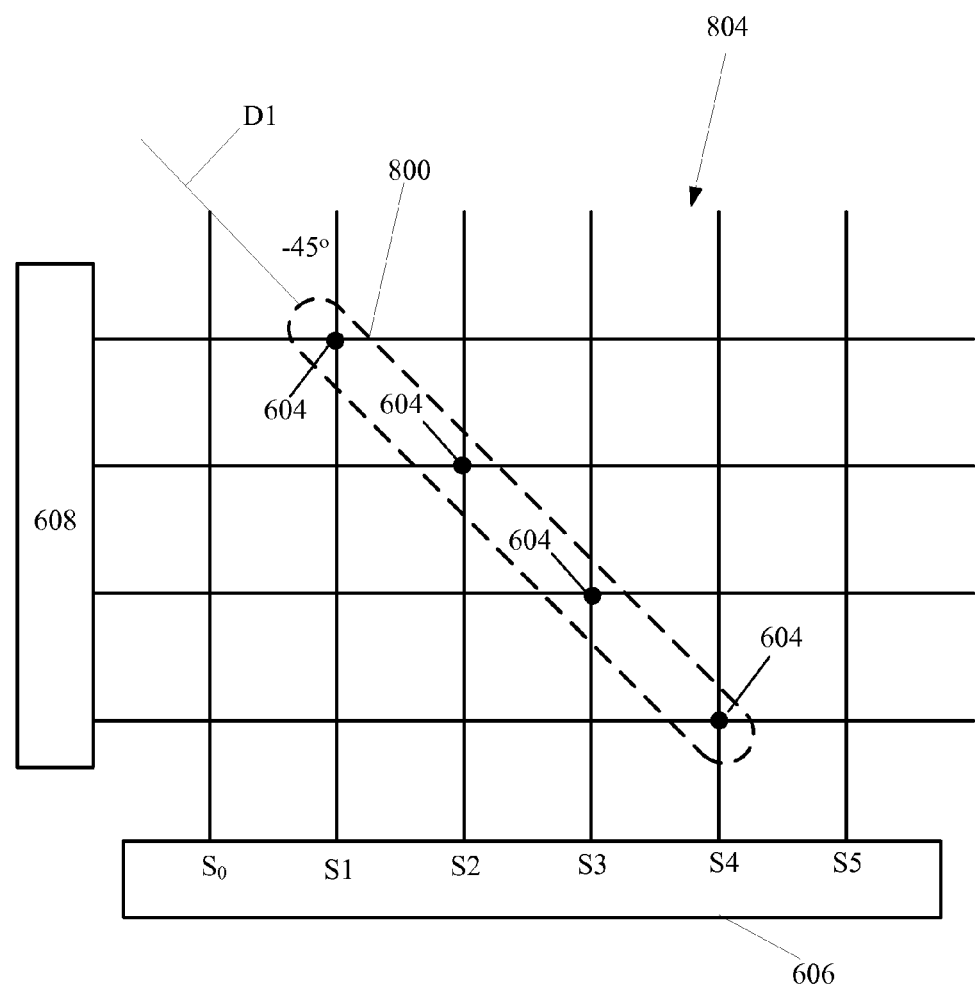
FIG. 8 shows a representative ungrounded metallic strip in relation to a detection grid of a touch screen in accordance with the described embodiments.
Figure 9:
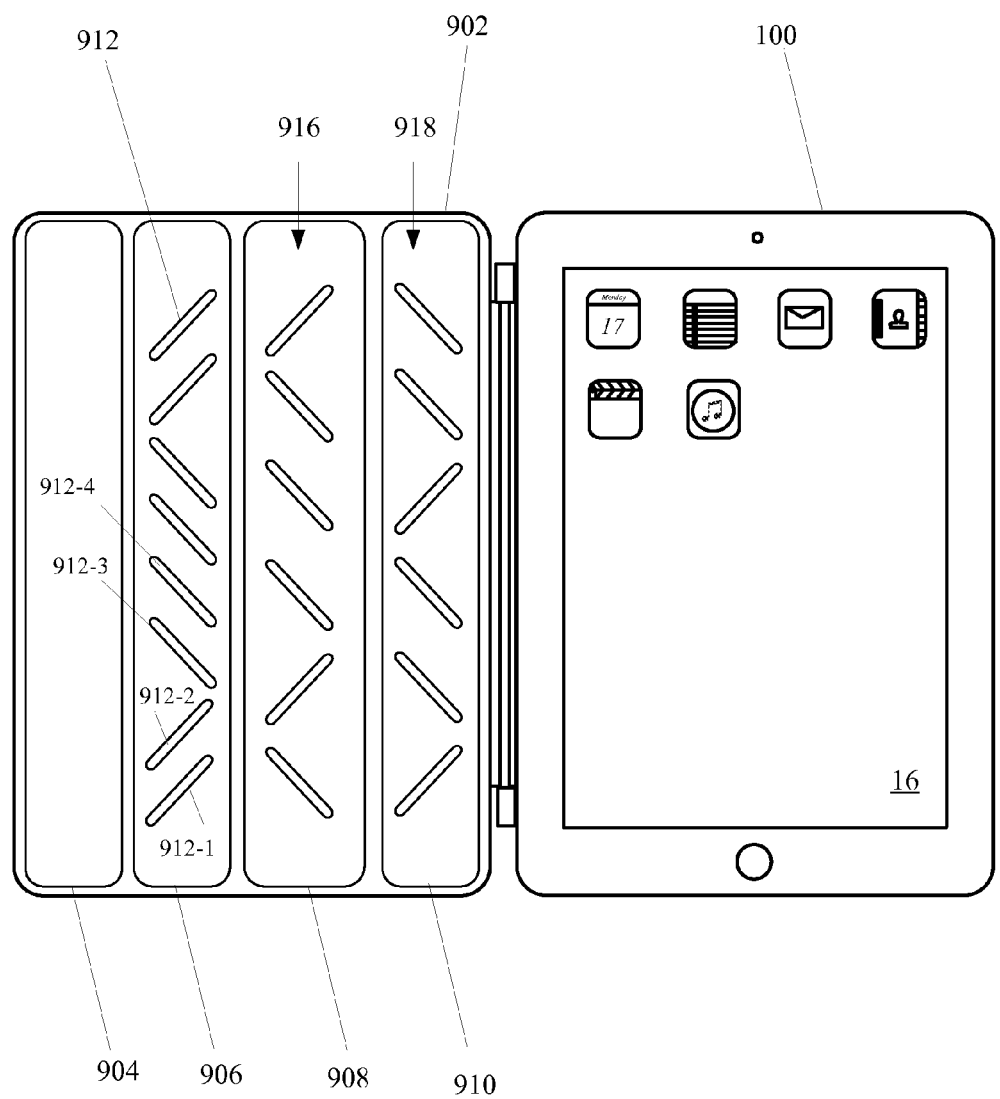
FIG. 9 shows system that includes protective cover pivotally coupled to tablet device in accordance with the described embodiments.

However, it is also possible to distinguish not only discrete objects such as a finger, but it is also possible to distinguish what can be referred to as a distributed object, or more simply a shape. For example, as shown in FIG. 8, ungrounded conductive strip 800 can be detected by MT 500 based in part upon the fact that conductive strip 800 is not grounded, there will be at least some conductive coupling between nodes 604 along diagonal D whenever, for example, row R is driven resulting in a signal S being detected by sense detectors S2 through S5 concurrently. In this way, even though diagonal conductive strip 800 is ungrounded, there is a sufficient correlation between pixels in separate rows that the presence of conductive strip 800 can be reliably detected as well as its orientation with respect to detection grid 804. In this way, information can be uniquely associated with various detectable characteristics of diagonal conductive strip 800. For example, as shown in FIG. 9, diagonal conductive strip 800 can have orientation $O_1$ relative to touch screen 502 whereas diagonal conductive strip 702 can have orientation $O_2$ relative to touch screen 502. Accordingly, information can be associated with both the position and orientations of diagonal conductive strip 400 and 402.

FIG. 9 shows system 900 that includes protective cover 902 pivotally coupled to tablet device 100 in accordance with the described embodiments. In this embodiment, protective cover 902 can include a number of segments 904-910 at least some of which can include capacitive elements arranged in various patterns. For example, capacitive elements 912 can take the form of metallic strips (formed of, for example, aluminum) that are incorporated into segment 906 in an first diagonal pattern 914 where at least some of diagonal metallic strips 912 are arranged in an diagonal alternating pattern. In order to maximum the reliability of detection by capacitive detection nodes 604 in display 16, each of the diagonal metallic strips 912 are arranged at about 45° in relation to the capacitive detection grid 804 in display 16 formed of capacitive detection nodes 604. Referring to first diagonal pattern 914, metallic diagonal strips 912-1 and 912-2 are arranged at about +45° in relation to the capacitive detection grid 804 in display 16 whereas metallic diagonal strips 912-3 and 912-4 are rotated 90° with respect to metallic diagonal strips 912-1 and 912-2 and about −45° in relation to the capacitive detection grid 806. In this way, each of the diagonal metallic strips can be associated with a specific information element (such as a data bit "1") that can depend, in part, upon the orientation of the specific diagonal metallic strip with respect to capacitive detection grid 806.

For example, diagonal metallic strip 912-1 can be associated with information element, or bit, corresponding to "1", 912-2 to "1", 912-3 to "0", 912-4 to "0", and so on. In this way, diagonal capacitive elements 912 can be associated with data word D1 {1, 1, 0, 0, 0, 0, 1, 1}. Likewise capacitive elements 916 in segment 908 can be associated with data word D2 {0, 1, 0, 0, 0, 1) and capacitive elements 918 in segment 910 can be associated with data word D3 {1, 0, 0, 1, 0, 0). It should be noted that the length of the various data words need not be the same for each segment. Moreover, the capacitive elements themselves can vary from one segment to another and even vary from within each segment. In this way, information can be stored in any number of different ways in protective cover 902.

Figure 10:
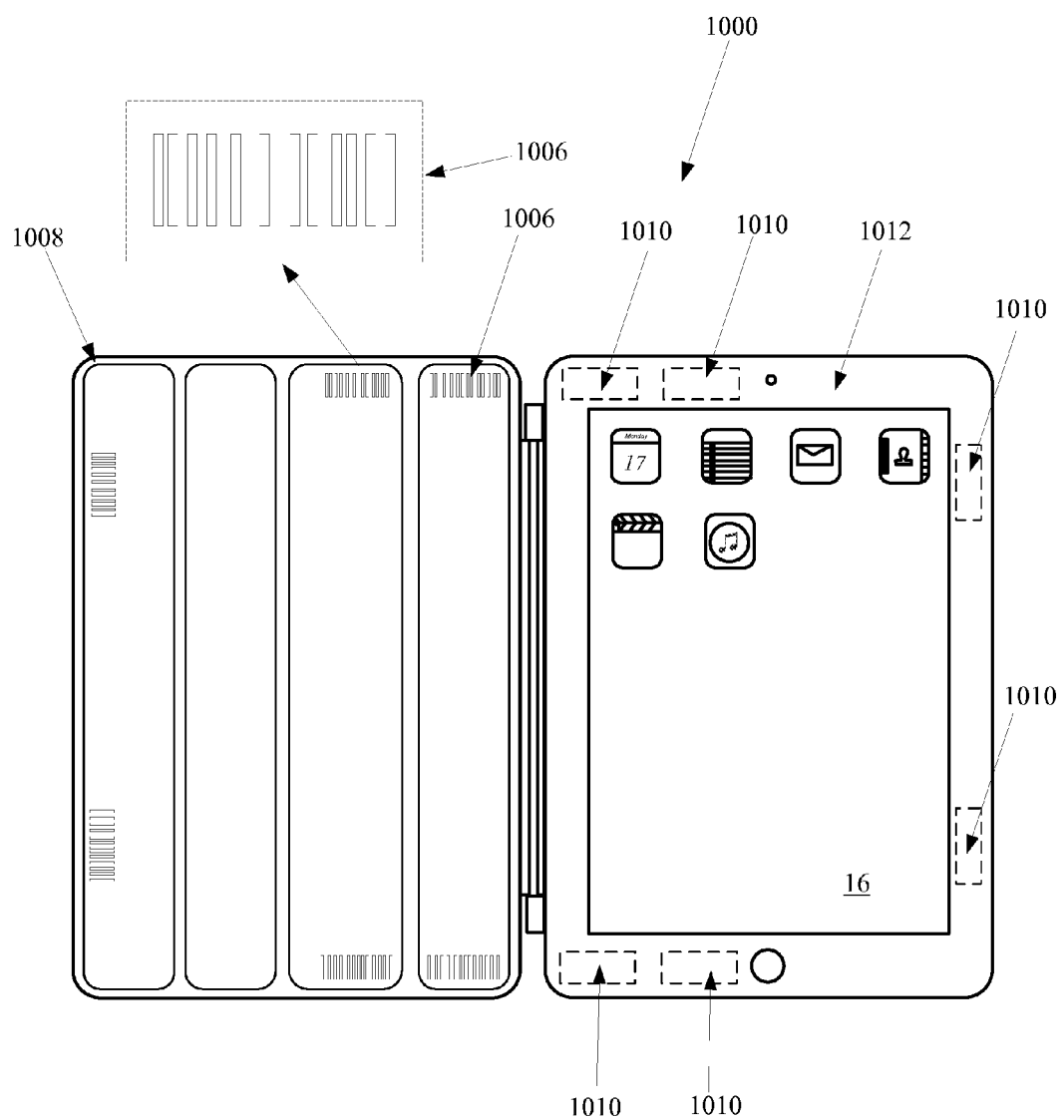
FIG. 10 shows system that includes protective cover pivotally connected to tablet device in accordance with the described embodiments.

FIG. 10 shows system 1000 that includes protective cover 1002 pivotally connected to tablet device 1004 in accordance with the described embodiments. Protective cover 1002 can include perimeter capacitive elements 1006 arrayed along a perimeter of flap 1008. In this way, capacitive detection circuits 1010 disposed beneath display mask 1012 can gather information regardless of the operating state of display 16. For example, when protective cover 1002 is in the closed configuration, display 16 will most likely be disabled thereby also disabling any touch screen functionality. However, with the presence of perimeter capacitive elements 1006, tablet device 1004 can still gather information from perimeter capacitive elements 1006 using perimeter detection circuits 1010. In one embodiment, perimeter capacitive elements 1006 can resemble an optical bar code in that information can be stored based upon the spacing, size, and electrical properties of each constituent capacitive element. It should be noted that the orientation of each of perimeter capacitive elements 1006 can be either diagonal, or not, in relation to the detection grid.

For example, due to the proximity of peripheral capacitive elements 1006 to an edge of flap 202 and housing 12 of tablet device 100, a path to chassis ground can be formed by the contact of the edge of flap 202 and housing 12. An electrical contact (s) can be incorporated into at least a portion of the edge of flap 202 thereby increasing a signal to noise ratio (SNR) of the capacitive signal provided by peripheral capacitive elements 1006. Therefore, due to the increase in SNR, the necessity for signal differentiation is reduced eliminating the need to use diagonal patterns.

Figure 12A:
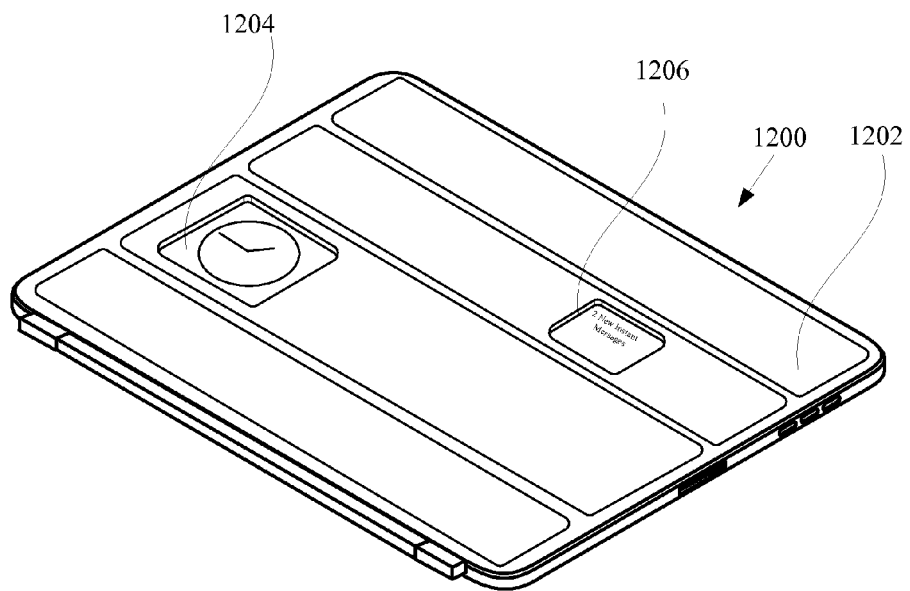
FIGS. 12A and 12B show representative system that includes protective cover having predetermined cut out regions in accordance with the described embodiments.
Figure 12B:
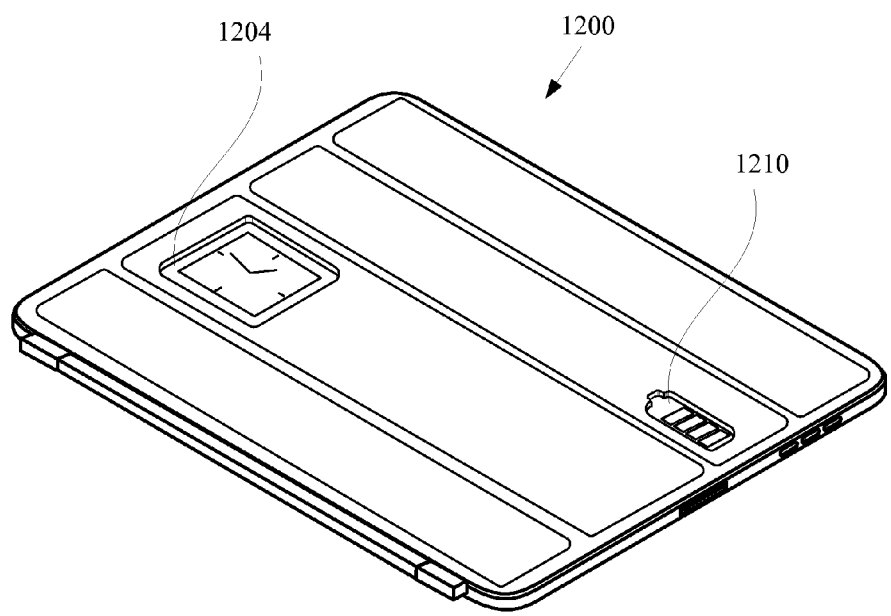

The following figures illustrate the use of information provided by information elements embedded in a protective cover in identifying specific functions that can be carried out by an associated tablet device. For example, as illustrated in FIGS. 12A and 12B, cover information can be used by the tablet device to provide specific visual information at particular locations that correspond to specific features (such as cut outs) of the protective cover. Using the example of the cut out regions, this visual information can be provided even in those situations where the protective cover is closed with respect to the tablet device.

Figure 11A:
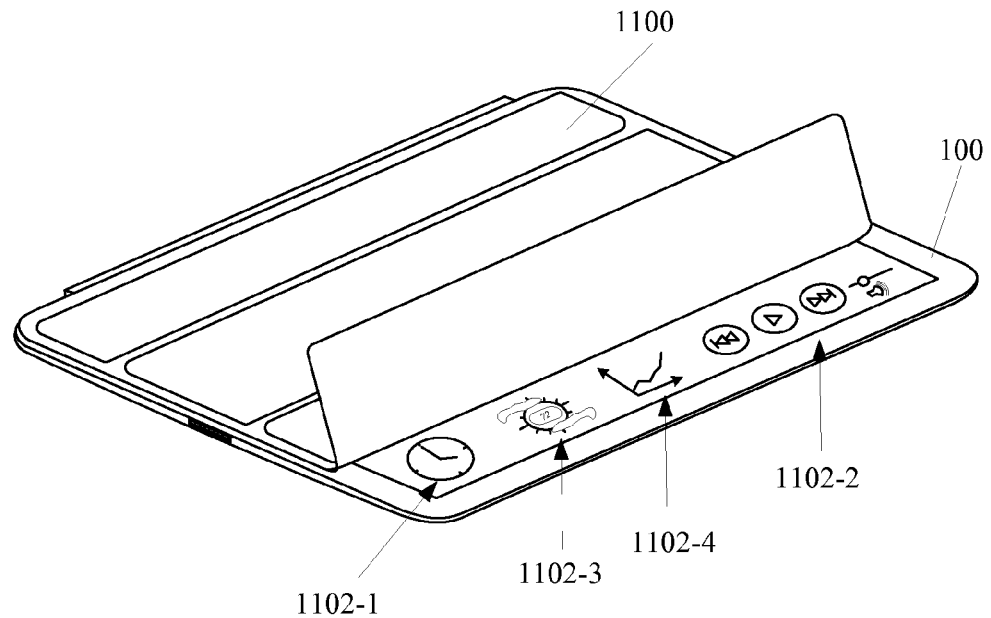
FIG. 11A and FIG. 11B show representative peek mode functionality in accordance with the described embodiments.
Figure 11B:
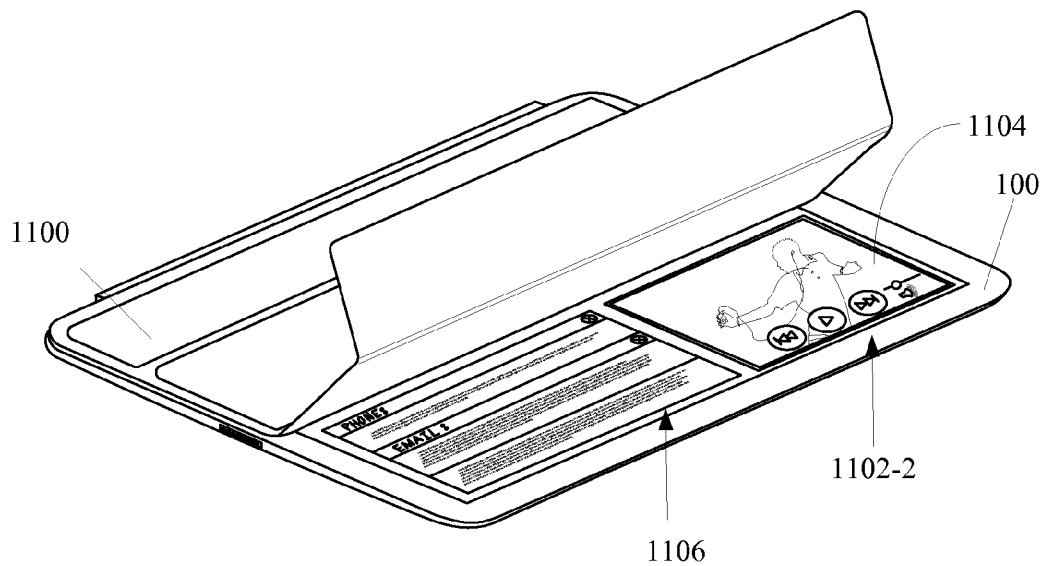

FIG. 11A and FIG. 11B shows a situation where information provided by protective cover 200 can cause tablet device 100 to operate in a peek mode in accordance with the described embodiments. More particularly, FIG. 11A illustrates how information provided by protective cover 100 can cause tablet device 100 to operate in a simple peek mode. In the described embodiments, tablet device 100 operates in simple peek mode when selected icons 1102 or other visual elements can be displayed only in viewable portion 1104 of display 16 of tablet device 100. Icons 1102 can be simply display type icons or in some instances, some or all of icons 1102 can be user interactive. For example, icon 1102-1 can display a clock showing the current time whereas icon 1102-2 can represent graphical user interfaces used to modify operations of a media player function performed by tablet device 100. Other icons can include, icon 1102-3 representing current weather conditions, icon 1102-4 representing a stock market result, and so on. FIG. 11B, on the other hand, illustrates a more advanced form of peek mode in which additional functionality can be enabled when it is determined that more than a pre-determined amount of display 16 is viewable. In this mode, additional information available in portions of protective cover 1100 in contact with display 16 can cause tablet device 100 to alter its operating state along the lines disclosed. For example, in an advanced peek mode, an additional display area that is viewable can be used to present video 1104 (with overlaid user interface 1102-2 or equivalent), textual data 1106 and so on.

FIGS. 12A and 12B show representative system that includes protective cover 1200 in accordance with the described embodiments. As shown, protective cover 1200 has portions of flap 1202 with specific regions removed. The regions removed can have specific shapes and be positioned in specific locations with respect to display 16. In this way, information provided by protective cover 1200 can cause tablet device 100 to present visual content in accordance with the size, shape, and locations of the cut out regions of protective cover 1200. For example, cut out region 1204 shown in FIG. 12A, can be have a size and shape associated with a clock icon whereas cut out region 1206 can be have a size and shape associated with a textual output such as a stock report, email, and so on. Moving on to FIG. 12B, cut out 1208 can have a size and shape in accordance with a battery icon used to indicate a current battery status. Accordingly, as an end user changes protective covers, specific characteristics of the protective cover can be used to alter operations of the tablet device in accordance with the specific characteristics conveyed by the information embedded in the protective cover.

Figure 12C:
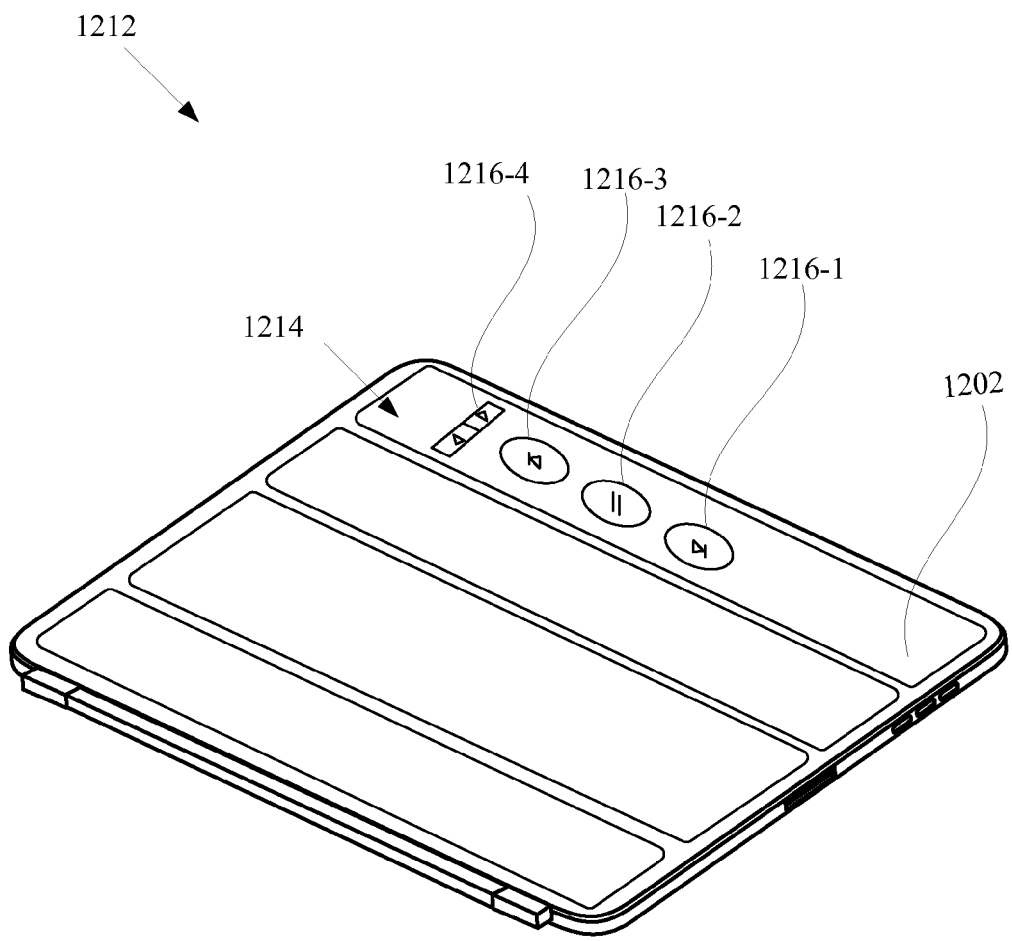
FIG. 12C shows representative system that includes capacitively coupled user interface in accordance with the described embodiments.

FIG. 12C shows representative cover system 1212 that includes capacitively linked user interface 1214 in accordance with the described embodiments. Capacitively linked user interface 1214 can provide an end-user an easy to access user interface that can used to control functions of tablet device 100. Capacitively linked user interface 1214 can include, for example, physical buttons 1216 (such as dome buttons) that can permit an end-user to provide instructions to tablet device 100. For example, dome buttons 1216-1 and 1216-3 can be used to provide a forward/reverse function whereas dome button 1216-2 can provide a pause function or a stop function. In one implement, each physical button 1216 can include terminals in the form of electrical traces or the like that can be connected to conductive strips inside protective cover 1200. When any of buttons 1216 is pressed, the terminals can be shorted having the effect of altering an electrical characteristic of the conductive strips incorporated within protective cover 1200. The altering of the electrical characteristics can be detected by the detection grid and can be further associated with information that can be used by the processor in tablet device 100.

For example, when fast forward dome button 1216-1 is pressed, terminals associated with button 1216-1 can be shorted having the effect of altering a capacitive pattern detected by tablet device 100. The altered capacitive pattern can be associated with increasing a play rate of media currently be presented by tablet device 100. On the other hand, pressing pause button 1216-2 can have the effect of pausing (or stopping and exiting) any current operation currently being carried out by tablet device 100. Additional input buttons can include, for example, up/down button 1216-4 that can be used to advance or regress chapters, go up/down a level, and so forth.

FIG. 12C shows representative cover system 1212 that includes capacitively linked user interface 1214 in accordance with the described embodiments. Capacitively linked user interface 1214 can provide an end-user an easy to access user interface that can used to control functions of tablet device 100. Capacitively linked user interface 1214 can include, for example, physical buttons 1216 (such as dome buttons) that can permit an end-user to provide instructions to tablet device 100. For example, dome buttons 1216-1 and 1216-3 can be used to provide a forward/reverse function whereas dome button 1216-2 can provide a pause function or a stop function. In one implement, each physical button 1216 can include terminals in the form of electrical traces or the like that can be connected to conductive strips inside protective cover 1200. When any of buttons 1216 is pressed, the terminals can be shorted having the effect of altering an electrical characteristic of the conductive strips incorporated within protective cover 1200. The altering of the electrical characteristics can be detected by the detection grid and can be further associated with information that can be used by the processor in tablet device 100.

For example, when fast forward dome button 1216-1 is pressed, terminals associated with button 1216-1 can be shorted having the effect of altering a capacitive pattern detected by tablet device 100. The altered capacitive pattern can be associated with increasing a play rate of media currently be presented by tablet device 100. On the other hand, pressing pause button 1216-2 can have the effect of pausing (or stopping and exiting) any current operation currently being carried out by tablet device 100. Additional input buttons can include, for example, up/down button 1216-4 that can be used to advance or regress chapters, go up/down a level, and so forth.

Figure 13:
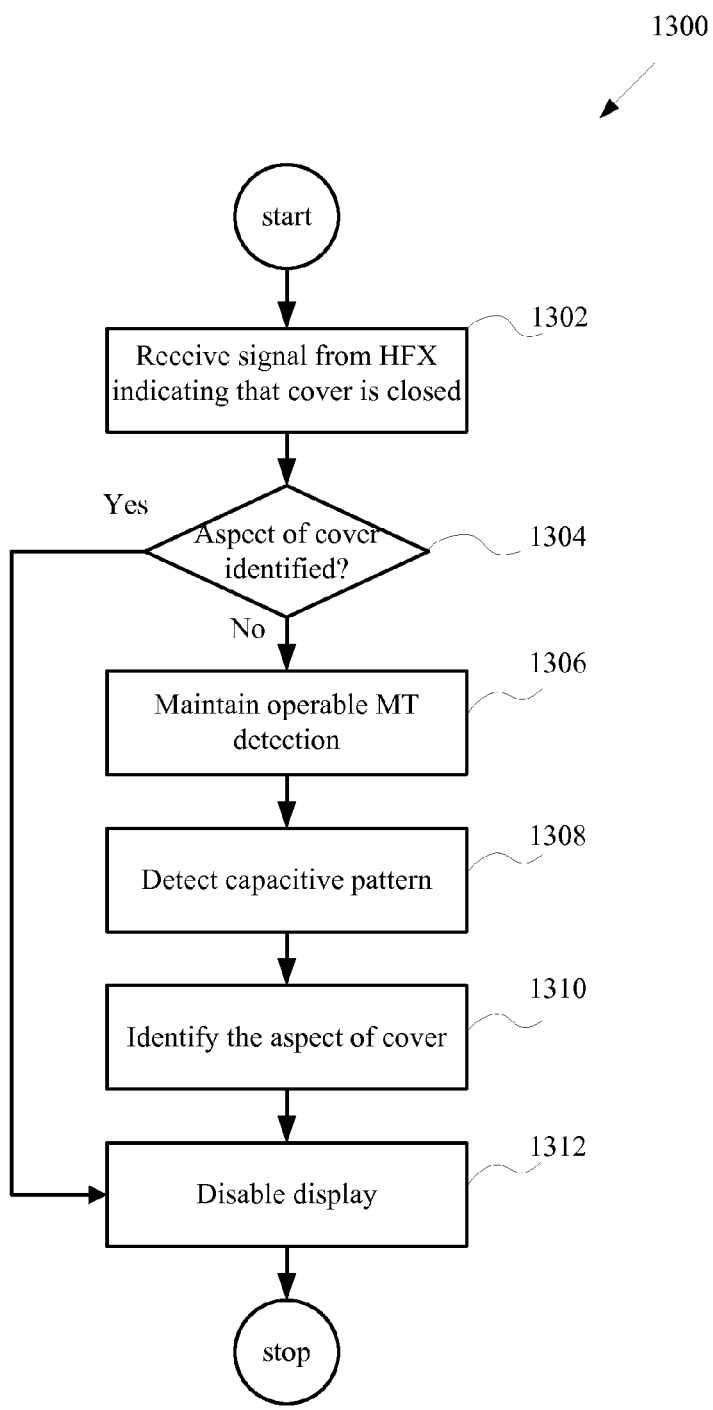
FIG. 13 shows a flowchart detailing process in accordance with the described embodiments.

FIG. 13 shows a flowchart detailing process 1300 in accordance with the described embodiments. Process 1300 can be performed by receiving a signal at 1302 from a Hall Effect sensor (HFX) indicating that a protective cover is in a closed configuration with respect to a display of a tablet device. At 1304, the processor in the tablet device responds to the signal from the HFX sensor and disables the display. At 1306, if the cover is determined to be identified, and then process 1300 ends, otherwise at 1308 the display is enabled and at 1310, capacitive patterns embodied within the cover are detected. The detected capacitive patterns are detected using capacitive sensing circuits in the display. At 1312, once the cover has been identified, then the display is disabled at 1314 and process 1300 ends.

Figure 14:
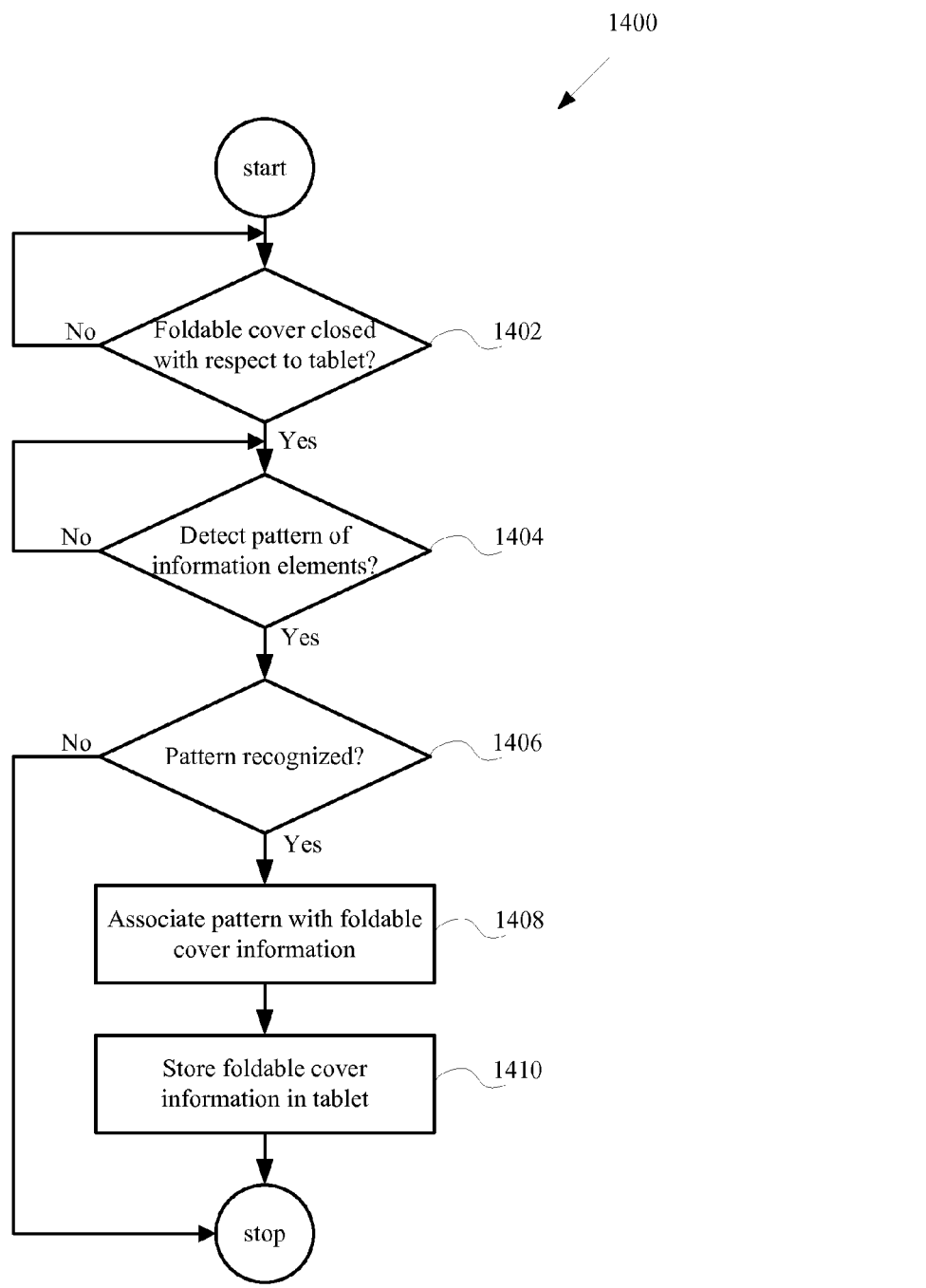
FIG. 14 shows a flowchart detailing process in accordance with the described embodiments.

FIG. 14 shows a flowchart detailing process 1400 in accordance with the described embodiments. Process 1400 can be carried out by performing at least the following operations by a tablet device associated with a foldable cover. In the described embodiment, process 1400 can start at 1402 by determining if the foldable cover is closed with respect to the tablet device. By closed it is meant that the protective cover is covering and therefore in proximity to a multi-touch (MT) detection grid disposed within the tablet device. For example, when the tablet device includes a display, the display can include MT functionality in accordance with the MT detection grid. Moreover, the determination if the cover is closed or not can be resolved in any suitable manner. For example, an optical sensor can detect the presence, or not, of the protective cover based upon an amount of light detected and based upon the amount of light deduce whether or not the foldable cover is closed or open.

In any case, once it is determined that the foldable cover is closed, a determination is made at 1404 if a pattern of information elements is detected. In one embodiment, the information elements can store information capacitively based upon size, orientation, shape, and so forth of the information elements and the MT detection grid. The pattern of information elements can, therefore, be based upon a correlation of individual characteristics of each of the information elements. For example, when the information element is a diagonal strip of aluminum, a rightward tilt can be associated with "1", whereas a leftward tilt can be associated with "0", and vice versa. When a pattern is detected, then at 1406, a determination is made if the pattern is recognized or not. When the pattern is not recognized, then process 1400 ends, otherwise, at 1408, the recognized pattern is associated with foldable cover information. The foldable cover information can include, for example, color, style, manufacture date and location, and so forth. At 1410, the foldable cover information can then be stored in a data storage device in the tablet device for future reference. For example, if part of the foldable cover information includes a serial number, then the serial number can be associated with a database of authorized foldable covers that can be periodically stored and updated in the data storage device in the tablet device. If the foldable cover serial number does not match an authorized serial number, then the presumption is that the cover is not authenticated.

Figure 15:
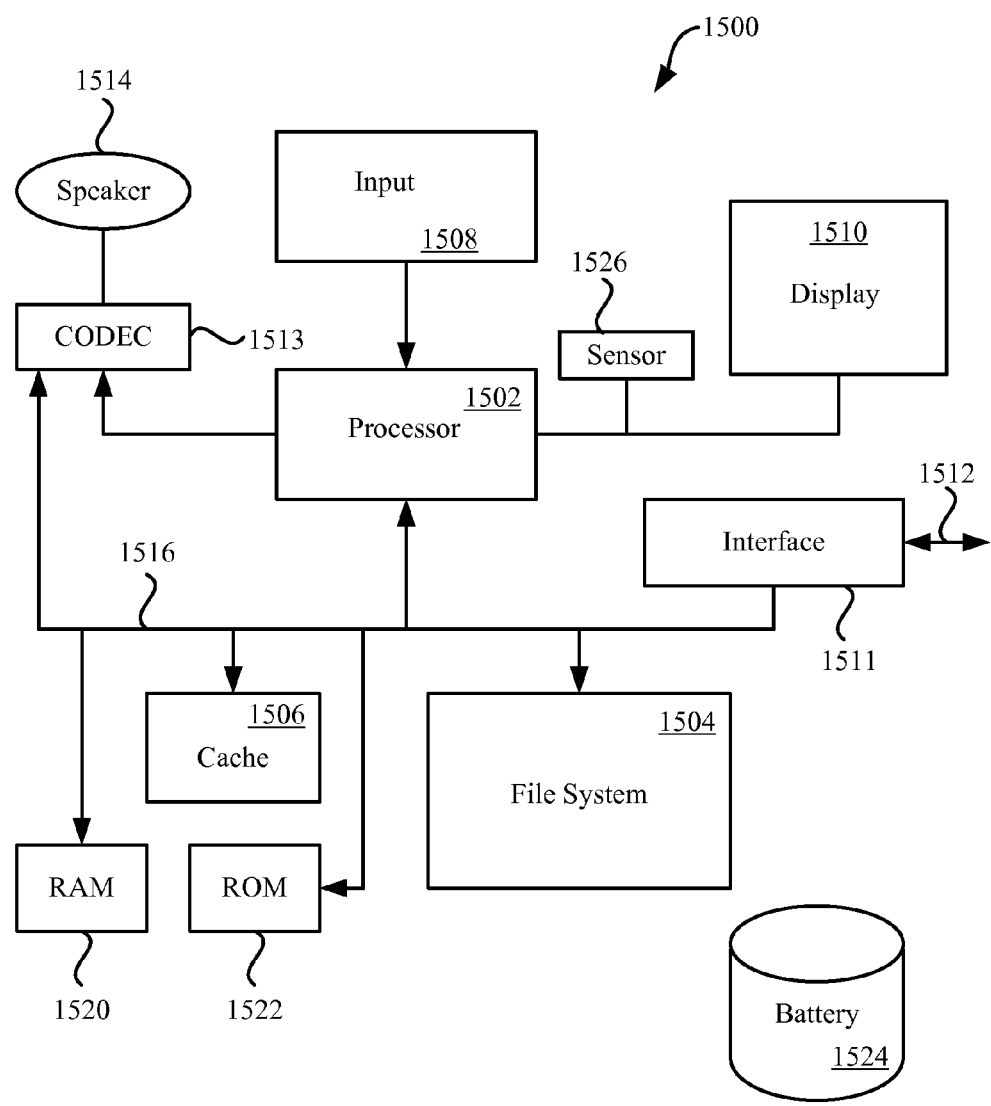
FIG. 15 is a block diagram of an electronic device suitable for use with the described embodiments.

FIG. 15 is a block diagram of an electronic device 1500 suitable for use with the described embodiments. The electronic device 1500 illustrates circuitry of a representative computing device. The electronic device 1500 includes a processor 1502 that pertains to a microprocessor or controller for controlling the overall operation of the electronic device 1500. The electronic device 1500 stores media data pertaining to media items in a file system 1504 and a cache 1506. The file system 1504 is, typically, a storage disk or a plurality of disks. The file system 1504 typically provides high capacity storage capability for the electronic device 1500. However, since the access time to the file system 1504 is relatively slow, the electronic device 1500 can also include a cache 1506. The cache 1506 is, for example, Random-Access Memory (RAM) provided by semiconductor memory. The relative access time to the cache 1506 is substantially shorter than for the file system 1504. However, the cache 1506 does not have the large storage capacity of the file system 1504. Further, the file system 1504, when active, consumes more power than does the cache 1506. The power consumption is often a concern when the electronic device 1500 is a portable media device that is powered by a battery 1524. The electronic device 1500 can also include a RAM 1520 and a Read-Only Memory (ROM) 1522. The ROM 1522 can store programs, utilities or processes to be executed in a non-volatile manner. The RAM 1520 provides volatile data storage, such as for the cache 1506.

The electronic device 1500 also includes a user input device 1508 that allows a user of the electronic device 1500 to interact with the electronic device 1500. For example, the user input device 1508 can take a variety of forms, such as a button, keypad, dial, touch screen, audio input interface, visual/image capture input interface, input in the form of sensor data, etc. Still further, the electronic device 1500 includes a display 1510 (screen display) that can be controlled by the processor 1502 to display information to the user. A data bus 1516 can facilitate data transfer between at least the file system 1504, the cache 1506, the processor 1502, and the CODEC 1513.

In one embodiment, the electronic device 1500 serves to store a plurality of media items (e.g., songs, podcasts, etc.) in the file system 1504. When a user desires to have the electronic device play a particular media item, a list of available media items is displayed on the display 1510. Then, using the user input device 1508, a user can select one of the available media items. The processor 1502, upon receiving a selection of a particular media item, supplies the media data (e.g., audio file) for the particular media item to a coder/decoder (CODEC) 1513. The CODEC 1513 then produces analog output signals for a speaker 1514. The speaker 1514 can be a speaker internal to the electronic device 1500 or external to the electronic device 1500. For example, headphones or earphones that connect to the electronic device 1500 would be considered an external speaker.

The electronic device 1500 also includes a network/bus interface 1511 that couples to a data link 1512. The data link 1512 allows the electronic device 1500 to couple to a host computer or to accessory devices. The data link 1512 can be provided over a wired connection or a wireless connection. In the case of a wireless connection, the network/bus interface 1511 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1526 can take the form of circuitry for detecting any number of stimuli. For example, sensor 1526 can include a Hall Effect sensor responsive to external magnetic field, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A consumer product system, comprising:
   a tablet device comprising:
      a housing with an opening defining an entire front portion of the tablet device,
      a processor carried by the housing,
      a transparent protective layer carried by the housing and disposed within the opening,
      a display assembly capable of communicating with the processor and overlaid by the transparent protective layer, the display assembly comprising:
         a display layer for presenting an icon viewable through the transparent protective layer, and
         a touch sensitive surface covered by the display layer, the touch sensitive surface having a size and a shape in accordance with the display layer and configured to form a capacitive coupling with an object at or near an exterior surface of the transparent protective layer; and
   a protective cover releasably attachable to the tablet device, the protective cover comprising:
      a first segment that carries the object;
      a second segment; and
      a folding region between the first segment and the second segment that allows the first segment to fold with respect to the second segment, wherein when:
         the first segment engages the transparent protective layer causing the capacitive coupling between the object and the touch sensitive surface defining a covered portion and an uncovered portion of the display layer, the uncovered portion defined by a removal of the second segment from the display layer, the uncovered portion presents a graphical user interface of the icon and the covered portion is inoperable to present the icon, and
         the first segment is removed from the transparent protective cover, the uncovered portion extends to a location corresponding to the covered portion and allows the icon to display the graphical user interface and video information.

2. The consumer product system as recited in claim 1, wherein the protective cover comprises a size and shape to fully cover the display layer, and wherein the touch sensitive surface comprises a plurality of capacitance sensors arranged in a rectangular grid and overlaid by the transparent protective layer.

3. The consumer product system as recited in claim 2, wherein the object comprises a plurality of capacitive elements that includes correlated conductive strips, at least one of which is oriented diagonal to the rectangular grid.

4. The consumer product system as recited in claim 3, wherein at least one of the correlated conductive strips is metallic.

5. The consumer product system as recited in claim 3, wherein the plurality of capacitive elements comprises information used by the tablet device.

6. The consumer product system as recited in claim 5, wherein the protective cover comprises a capacitively linked user interface in communication with the correlated conductive strips, and wherein the correlated conductive strips are alterable in accordance with an external event at an accessible surface of the protective cover to provide a control input to the tablet device.

7. The consumer product system as recited in claim 6, wherein the external event comprises a touch event with the accessible surface of the protective cover, the touch event configured to control a media file stored on the tablet device.

8. The consumer product system as recited in claim 6, wherein the accessible surface of the cover corresponds to a button assembly.

9. The consumer product system as recited in claim 5, wherein the information corresponds to a property of the protective cover, the property selected from a color or a date of origin of the protective cover.

10. The consumer product system as recited in claim 5, wherein the protective cover comprises a cut out region, and wherein the tablet device uses the information from the plurality of capacitive elements to 1) locate the cut out region and 2) display the icon on the display layer only at a location corresponding to the cut out region.

11. A tablet device for use with a protective cover, the protective cover comprising a first segment, a second segment, and a folding region between the first segment and the second segment that allows the first segment to fold with respect to the second segment, the tablet device comprising:
a housing comprising sidewalls that combine to form an opening defining an entire front portion of the housing;
a processor carried by the housing;
a display layer capable of communication with the processor, the display layer comprising a perimeter detection circuit configured to detect a perimeter capacitive element disposed in the protective cover when the protective cover overlays the display layer such that the display layer is at least partially covered by the protective cover defining a covered portion and an uncovered portion of the display layer, the uncovered portion defined by a removal of the second segment from the display layer when the second segment folds away from the first segment by the folding region;
a transparent protective layer carried by the housing at the opening, the transparent protective layer covering the display assembly and comprising a display mask that hides the perimeter detection circuit, wherein in response to the perimeter capacitive element capacitively coupling with the perimeter detection circuit:
the display layer is inactive to present the visual content, and
the perimeter detection circuit remains active to communicate with the processor and provide information corresponding to the perimeter capacitive element, wherein in response to the protective cover partially covering the display layer, the display layer presents the visual content only in a location corresponding to the uncovered portion.

12. The tablet device as recited in claim 11, wherein the visual content in the uncovered portion comprises an icon having a graphical user interface used to modify an operation of the tablet device, and wherein the display assembly comprises a size and a shape capable of being fully covered by the protective cover.

13. The tablet device as recited in claim 12, wherein in response to the protective cover being partially removed from the display layer, the display layer comprises:
a second covered portion of the display layer less than the covered portion; and
a second uncovered portion of the display layer greater than the uncovered portion, the second uncovered portion causing the icon to 1) extend along the second uncovered portion, and 2) further include a second function comprising video controllable by the graphical user interface.

14. A method for controlling a tablet device with a protective cover comprising a first segment that includes an object, the protective cover further including a second segment secured with the first segment at a foldable region such that the first segment and the second segment are foldable with respect to each other, the tablet device comprising a transparent outer protective layer covering both 1) a display layer arranged to present an icon having a graphical user interface used to modify an operation of the tablet device, and 2) a touch sensitive surface comprising capacitive nodes covered by the display layer, the capacitive nodes configured to capacitively couple with the object at or near an exterior surface of the transparent outer protective layer, the method comprising:
determining, based on a capacitive coupling between at least one of the capacitive nodes and the object, a portion of the transparent outer protective layer that is not viewable defining an unviewable portion of the display layer, wherein a remaining portion of the display layer defines a first viewable portion that displays the icon that includes a graphical user interface, the first viewable portion corresponding to the display layer being uncovered by the second segment of the protective cover;
rendering the unviewable portion inoperable to present the icon, wherein all of the capacitive nodes remain fully operable to provide to the tablet device an indication of the protective cover in relation to the tablet device, and wherein the protective cover includes a size and a shape in accordance with the display layer; and
removing the first segment to render a second viewable portion of the display layer that is greater than the first viewable portion, thereby causing the icon to extend across the second viewable portion, wherein the tablet device is altered such that the icon includes the graphical user interface and display video.

15. The method as recited in claim 14, further comprising determining a viewable portion of the display layer, the viewable portion defined by a region of the transparent outer protective layer uncovered by the protective cover, wherein the capacitive nodes comprise:
a first capacitive node capacitively coupled with the object; and
a second capacitive node that is not capacitively coupled with the object.

16. The method as recited in claim 14, further comprising determining a viewable portion of the display layer based upon the unviewable portion, wherein the viewable portion displays the icon while the protective cover is disposed over the unviewable portion.

17. The method as recited in claim 14, wherein the object comprises a first set of capacitive elements embedded in the first segment according to a first diagonal pattern, and wherein the second segment comprises a second set of capacitive elements embedded in the second segment according to a second diagonal pattern different from the first diagonal pattern.

18. The method as recited in claim 14, further comprising:
forming a cut out region in the first segment;
determining, when the first segment covers the display layer, a location of the cut out region based on a capacitive coupling between the object and the capacitive nodes; and presenting visual information on the display layer at location corresponding to the cut out region.

* * * * *